US009527560B2

(12) United States Patent
Khachaturian

(10) Patent No.: US 9,527,560 B2
(45) Date of Patent: *Dec. 27, 2016

(54) MARINE LIFTING APPARATUS

(71) Applicant: Jon Khachaturian, Houston, TX (US)

(72) Inventor: Jon Khachaturian, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/686,389

(22) Filed: Apr. 14, 2015

(65) Prior Publication Data

US 2015/0291267 A1 Oct. 15, 2015

Related U.S. Application Data

(63) Continuation of application No. 13/641,020, filed as application No. PCT/US2010/031037 on Apr. 14, (Continued)

(51) Int. Cl.
| | | |
|---|---|---|
| B63B 35/44 | (2006.01) |
| B63C 7/04 | (2006.01) |
| B66C 13/02 | (2006.01) |
| B66C 17/06 | (2006.01) |
| B66C 23/52 | (2006.01) |
| B63B 1/14 | (2006.01) |
| B63B 9/00 | (2006.01) |
| B63B 9/06 | (2006.01) |
| B63B 25/00 | (2006.01) |

(52) U.S. Cl.
CPC . *B63C 7/04* (2013.01); *B63B 1/14* (2013.01); *B63B 9/00* (2013.01); *B63B 9/06* (2013.01); *B63B 25/002* (2013.01); *B66C 13/02* (2013.01); *B66C 17/06* (2013.01); *B66C 23/52* (2013.01); *Y10T 29/49002* (2015.01)

(58) Field of Classification Search
CPC ............... B63B 9/00; B63B 9/06; B63B 1/14; B63C 7/04
See application file for complete search history.

(56) References Cited

U.S. PATENT DOCUMENTS

| 485,398 A | 11/1892 | Tyler et al. |
| 541,794 A | 6/1895 | Schon |

(Continued)

FOREIGN PATENT DOCUMENTS

| KR | 10-2010-0008652 | 1/2010 |
| WO | WO99/13164 | 3/1999 |

*Primary Examiner* — Stephen Avila
(74) *Attorney, Agent, or Firm* — Garvey, Smith, Nehrbass & North, L.L.C.; Charles C. Garvey, Jr.; Vanessa M. D'Souza

(57) ABSTRACT

A catamaran lifting apparatus is disclosed for lifting objects in a marine environment. The apparatus includes first and second vessels that are spaced apart during use. A first frame and a second frame each spans between the vessels. The frames are spaced apart and connected to the vessels in a configuration that spaces the vessels apart. The first frame connects to the first vessel with a universal joint and to the second vessel with a hinged connection. The second frame connects to the second vessel with a universal joint and to the first vessel with a hinged or pinned connection. Each of the frames provides a space under the frame and in between the barges that enables a package to be lifted and/or a marine vessel to be positioned in between the barges and under the frames. An object that has been salvaged can be placed upon the vessel.

24 Claims, 17 Drawing Sheets

Related U.S. Application Data 2010, now Pat. No. 9,003,988, which is a continuation-in-part of application No. 12/337,305, filed on Dec. 17, 2008, now Pat. No. 7,886,676.

(60) Provisional application No. 61/014,291, filed on Dec. 17, 2007.

(56) References Cited

U.S. PATENT DOCUMENTS

| | | |
|---|---|---|
| 1,659,647 A | 2/1928 | Althouse |
| 3,807,336 A | 4/1974 | Briggs |
| 4,385,583 A | 5/1983 | Ayers |
| 4,714,382 A | 12/1987 | Khachaturian |
| 5,054,415 A | 10/1991 | Marshall |
| 5,479,869 A | 1/1996 | Coudon et al. |
| 5,607,260 A | 3/1997 | Khachaturian |
| 5,609,441 A | 3/1997 | Khachaturian |
| 5,662,434 A | 9/1997 | Khachaturian |
| 5,800,093 A | 9/1998 | Khachaturian |
| 5,836,463 A | 11/1998 | Khachaturian |
| 5,863,085 A | 1/1999 | Khachaturian |
| 5,975,807 A | 11/1999 | Khachaturian |
| 6,000,562 A | 12/1999 | Khachaturian |
| 6,039,506 A | 3/2000 | Khachaturian |
| 6,079,760 A | 6/2000 | Khachaturian |
| 6,149,350 A | 11/2000 | Khachaturian |
| 6,213,319 B1 | 4/2001 | Khachaturian |
| 6,296,288 B1 | 10/2001 | Khachaturian |
| 6,318,931 B1 | 11/2001 | Khachaturian |
| 6,364,574 B1 | 4/2002 | Khachaturian |
| 6,367,399 B1 | 4/2002 | Khachaturian |
| 6,412,649 B1 | 7/2002 | Khachaturian |
| 6,425,710 B1 | 7/2002 | Khachaturian |
| 7,527,006 B2 | 5/2009 | Khachaturian |
| 7,845,296 B1 | 12/2010 | Khachaturian |
| 7,886,676 B2 | 2/2011 | Khachaturian |
| 8,240,264 B2 | 8/2012 | Khachaturian |
| 9,003,988 B2 | 4/2015 | Khachaturian |
| 2005/0159052 A1 | 7/2005 | Borrett |
| 2007/0009329 A1 | 1/2007 | Chouest |
| 2009/0301372 A1 | 12/2009 | Khachaturian |

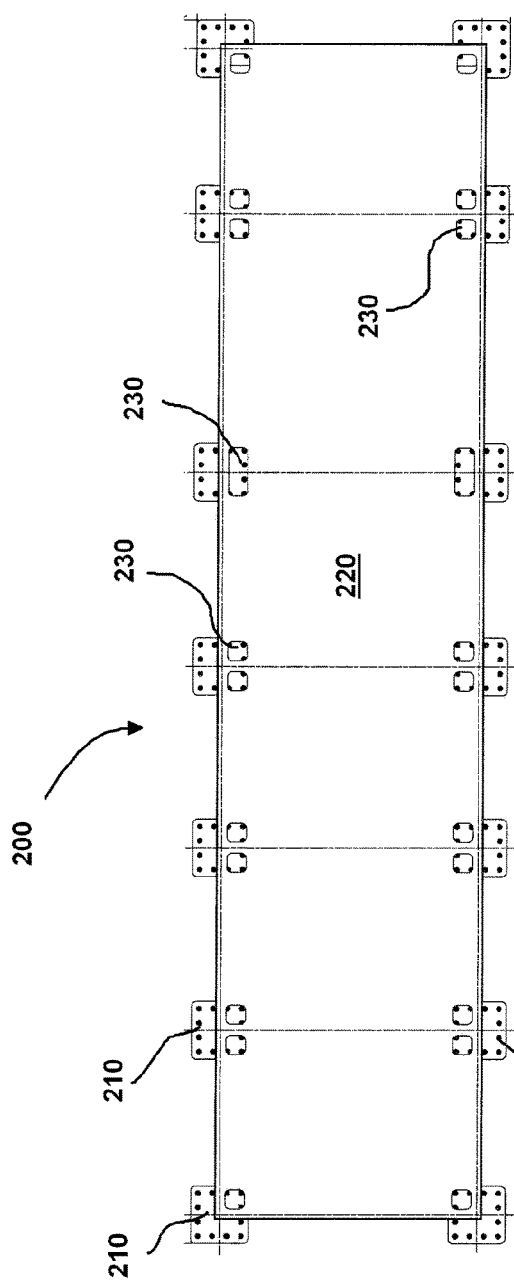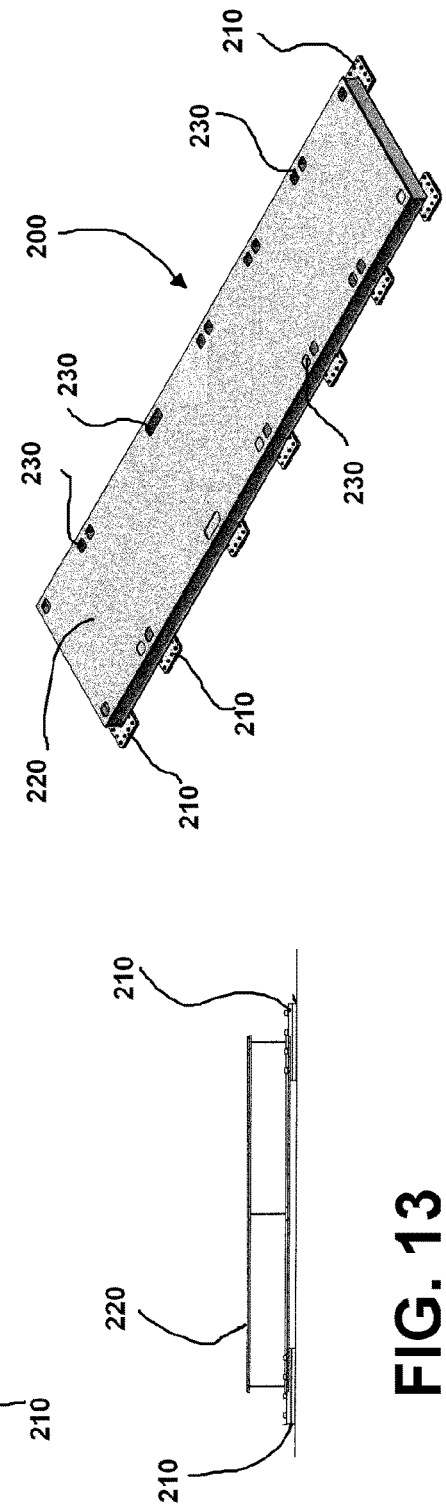
FIG. 12
FIG. 11
FIG. 13

MARINE LIFTING APPARATUS

CROSS-REFERENCE TO RELATED APPLICATIONS

This is a continuation of U.S. patent application Ser. No. 13/641,020, filed Feb. 22, 2013 (issued as U.S. Pat. No. 9,003,988 on Apr. 14, 2015), which is a 35 U.S.C. 371 national stage entry application of International Patent Application Serial No. PCT/US2010/031037, filed Apr. 14, 2010, which is a continuation-in-part of U.S. patent application Ser. No. 12/337,305, filed Dec. 17, 2008 (issued as U.S. Pat. No. 7,886,676 on Feb. 15, 2011), which application claimed priority of U.S. Provisional Patent Application Ser. No. 61/014,291, filed Dec. 17, 2007, both of which are incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to marine lifting devices. More particularly, the present invention relates to an improved catamaran type lifting apparatus that employs spaced apart or catamaran hulls, each of the hulls supporting a truss or frame that spans between the hulls at spaced apart positions. Even more particularly, the present invention relates to an improved catamaran lifting apparatus for use in a marine environment, wherein spaced apart frames are connected to the hulls in a configuration that spaces the vessels apart, the first frame connecting with a first of the hulls with the universal joint and to the second hull with a hinged connection, the second frame connecting to the second hull with a universal joint and to the first hull with a hinged connection.

2. General Background of the Invention

A catamaran lifting apparatus that can be used to lift multi-ton objects employs two spaced apart barges or hulls or vessels. In general, such lifting devices that employ a pair of spaced apart hulls have been patented. Additionally, many marine lifting patents having been issued to applicant. These and other possibly relevant patents are contained in the following table, the order of listing being of no significance.

TABLE 1

| PAT. NO. | TITLE | ISSUE DATE MM-DD-YYYY |
|---|---|---|
| 485,398 | Apparatus for Raising Sunken Vessels | Nov. 1, 1892 |
| 541,794 | Apparatus for Raising Sunken Vessels | Jun. 25, 1895 |
| 1,659,647 | Sea Crane | Feb. 21, 1928 |
| 4,714,382 | Method and Apparatus for the Offshore Installation of Multi-Ton Prefabricated Deck Packages on Partially Submerged Offshore Jacket Foundations | Dec. 22, 1987 |
| 5,607,260 | Method and Apparatus for the Offshore Installation of Multi-Ton Prefabricated Deck Packages on Partially Submerged Offshore Jacket Foundations | Mar. 4, 1997 |
| 5,609,441 | Method and Apparatus for the Offshore Installation of Multi-Ton Prefabricated Deck Packages on Partially Submerged Offshore Jacket Foundations | Mar. 11, 1997 |
| 5,662,434 | Method and Apparatus for the Offshore Installation of Multi-Ton Prefabricated Deck Packages on Partially Submerged Offshore Jacket Foundations | Sep. 2, 1997 |
| 5,800,093 | Method and Apparatus for the Offshore Installation of Multi-Ton Packages Such as Deck Packages, Jackets, and Sunken Vessels | Sep. 1, 1998 |
| 5,975,807 | Method and Apparatus for the Offshore Installation of Multi-Ton Packages Such as Deck Packages and Jackets | Nov. 02, 1999 |
| 6,039,506 | Method and Apparatus for the Offshore Installation of Multi-Ton Packages Such as Deck Packages and Jackets | Mar. 21, 2000 |
| 6,149,350 | Method and Apparatus for the Offshore Installation of Multi-Ton Packages Such as Deck Packages and Jackets | Nov. 21, 2000 |
| 6,318,931 | Method and Apparatus for the Offshore Installation of Multi-Ton Packages Such as Deck Packages and Jackets | Nov. 20, 2001 |
| 6,364,574 | Method and Apparatus for the Offshore Installation of Multi-Ton Packages Such as Deck Packages and Jackets | Apr. 2, 2002 |
| 7,527,006 | Marine lifting apparatus | May 5, 2009 |

BRIEF SUMMARY OF THE INVENTION

The present invention provides an improved catamaran lifting apparatus that employs first and second spaced apart vessels or hulls. The vessels can be barges, dynamically positioned marine vessels, other floating hulls or the like.

A first frame or truss spans between the hulls at a first position. A second frame or truss spans between the hulls at a second position. The first and second positions are spaced apart so that each frame can move independently of the other, notwithstanding wave action acting upon the hulls.

The first of the frames or trusses connects to the first hull with a universal joint and to the second hull with a hinged connection. The second frame connects to the second hull with a universal joint and to the first hull with a hinged connection. The catamaran hull arrangement provides longitudinal flexibility in a quartering sea state due to the unique universal joint and hinge placement between the frames or trusses and the hulls or barges.

Each frame extends upwardly in a generally inverted u-shape that provides space under the frame and in between the hulls for enabling a marine vessel to be positioned in between the hulls and under the frames. The space in between the hulls and under the frames can also be used as clearance for elevating an object to be salvaged from the seabed to a position next to or above the water's surface.

In a plan view, each frame can be generally triangular in shape. The frames can each be of a truss configuration.

In a second embodiment, one or more slings can be provided that connect between a frame and a hull. The connection of each frame to a hull opposite the universal joint can be a pinned or a hinged connection.

In another embodiment, dynamically positioned vessels are controlled from a single computer, single locale or by a single bridge or pilot. This specially configured arrangement enables the use of two class one (1) dynamically positioned vessels to be used to form a new vessel which is classified as a class two (2) dynamically positioned vessel. The method and apparatus of the present invention allows for the structural coupling of two existing vessels (ships, supply boats etc.). The vessels provide a structural foundation for the gantry system for lifting operations as well as personnel housing, propulsion for combined system travel and position keeping through the use of dynamic positioning.

Through the integration of two vessels with existing propulsion and dynamic positioning systems to form a single vessel/system, the performance of the propulsion and dynamic positioning systems for the integrated vessel/system is superior. This arrangement provides vessels of one class of DP system such as DP class 1. However, with the method and apparatus of the present invention, a new vessel will have a DP system of a higher class such as DP 2 as a result of being combined/integrated together to form a single system. The performance of the propulsion system for the combined system of the present invention will also be superior when compared to the performance of the individual vessels. Superior in this regards means that the combined system will have multiple independent engine rooms and fuel supplies which provides greater propulsion redundancy. The loss of a main engine room due to flood or fire, or the contamination of an engine room fuel supply on one of the vessels will no longer result in the loss of propulsion for the combined system. Similarly steerage for the combined system can still be achieved given the loss of steerage (rudder or equivalent system) on one of the individual vessels.

All of the above make the performance of the combined system superior to the performance of the existing individual systems without fundamental change or modification to the individual vessels, i.e. it is the combining of the vessels through the use of gantries which are enabled by the Bottom Feeder technology which lead to the performance improvements.

The "quality" of a dynamic positioning system can be measured via robustness of the system and capability. Robustness of the system is a measure of how many components within the DP system can fail and the DP system remain able to maintain station keeping capabilities. The international standard for this is to assign a rating or classification to the DP system. There are three ratings: Class 1, Class 2 and Class 3 (see supplied reference data on this). Higher classes of system have greater degrees of design redundancy and component protection. Through the integration of two lower class vessels, higher levels of component and system redundancy automatically result. The ability of the system to maintain station within a given set of wind, wave and current conditions is generally referred to as "capability". The higher capability the worse the conditions the system can stay on location during. Capability is in turn a function of thruster horsepower (or equivalent), numbers of thrusters and disposition (location) of thrusters around the vessel which will influence a thrusters ability to provide restoring force capability. Through the integration of two vessels of a given capability increased capabilities will result since (a) there are now more thrusters in the combined system, and (b) the thrusters have a much better spatial distribution which means that the thrusters can provide a greater restoring capability. Further, the capability of the DP system will be superior even given the loss of system component for the same reasons in (a) and (b). Damaged system capability is also another recognized measure of DP system quality.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 11 is a perspective view of one embodiment of a retrofit base for the method and apparatus;

FIG. 12 is a plan view of the base of FIG. 11;

FIG. 13 is a side view of the base of FIG. 11;

DETAILED DESCRIPTION OF THE INVENTION

Figure 1:
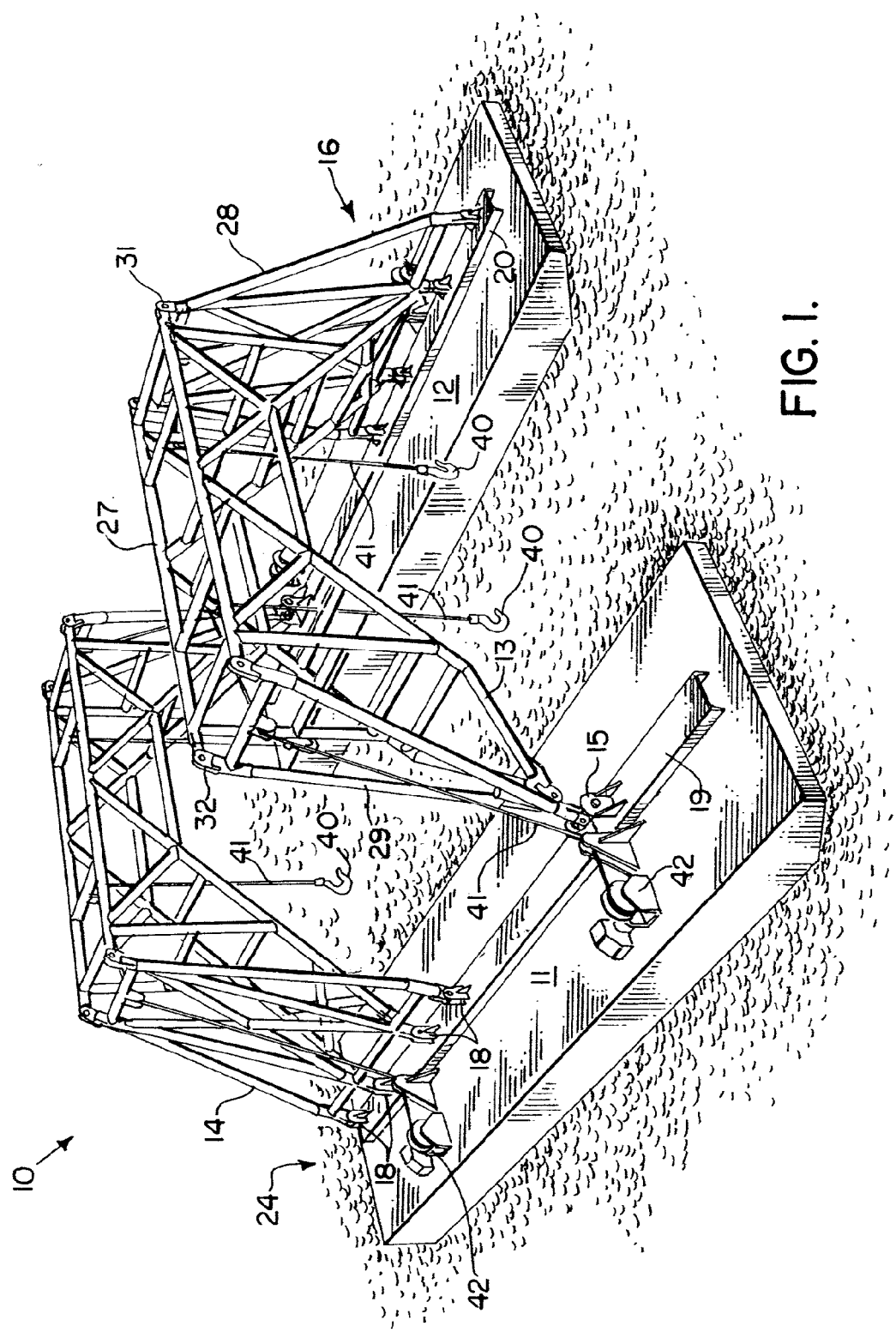
FIG. 1 is a perspective view of the preferred embodiment of the apparatus of the present invention.
Figure 2:
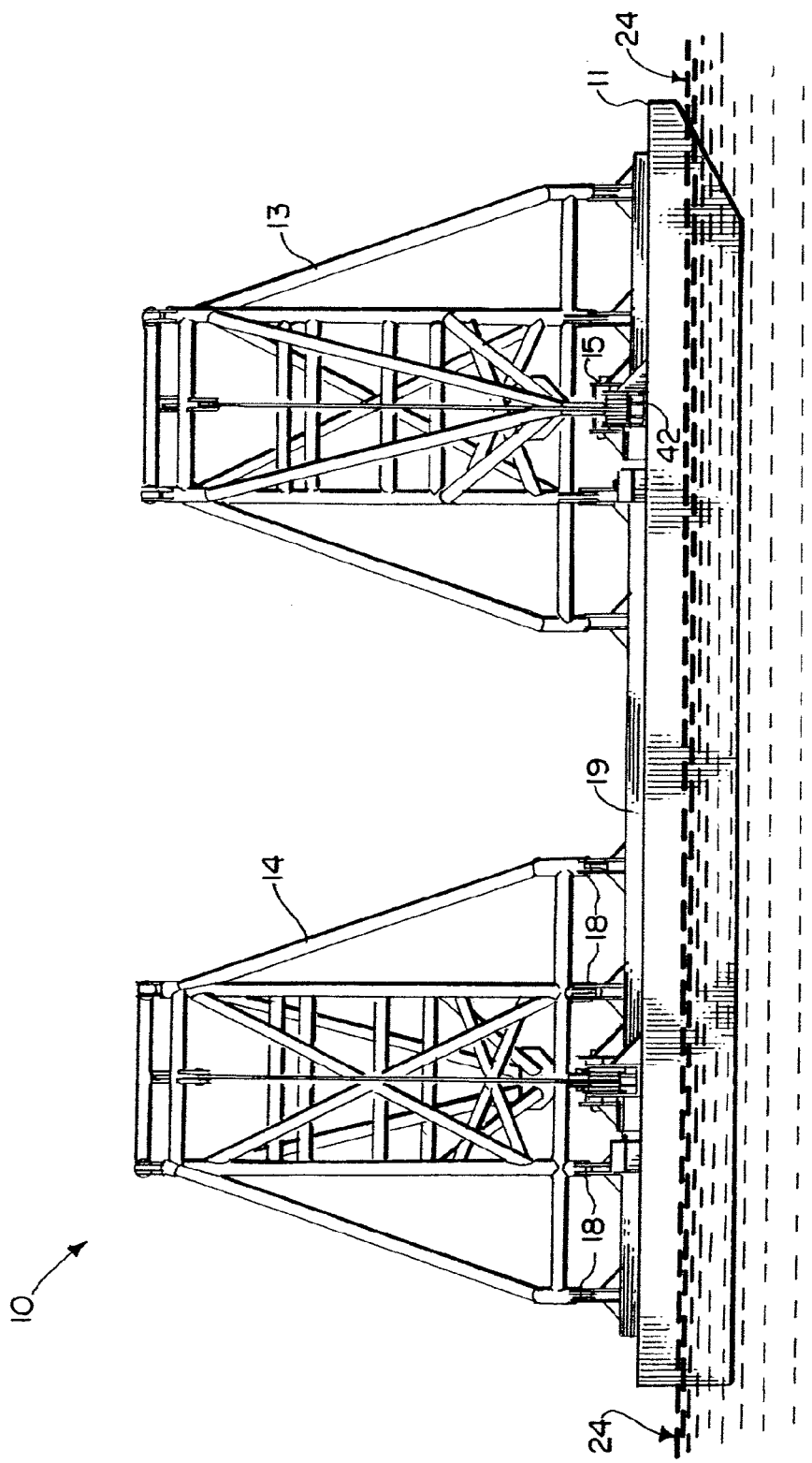
FIG. 2 is an elevation view of the preferred embodiment of the apparatus of the present invention.
Figure 6:
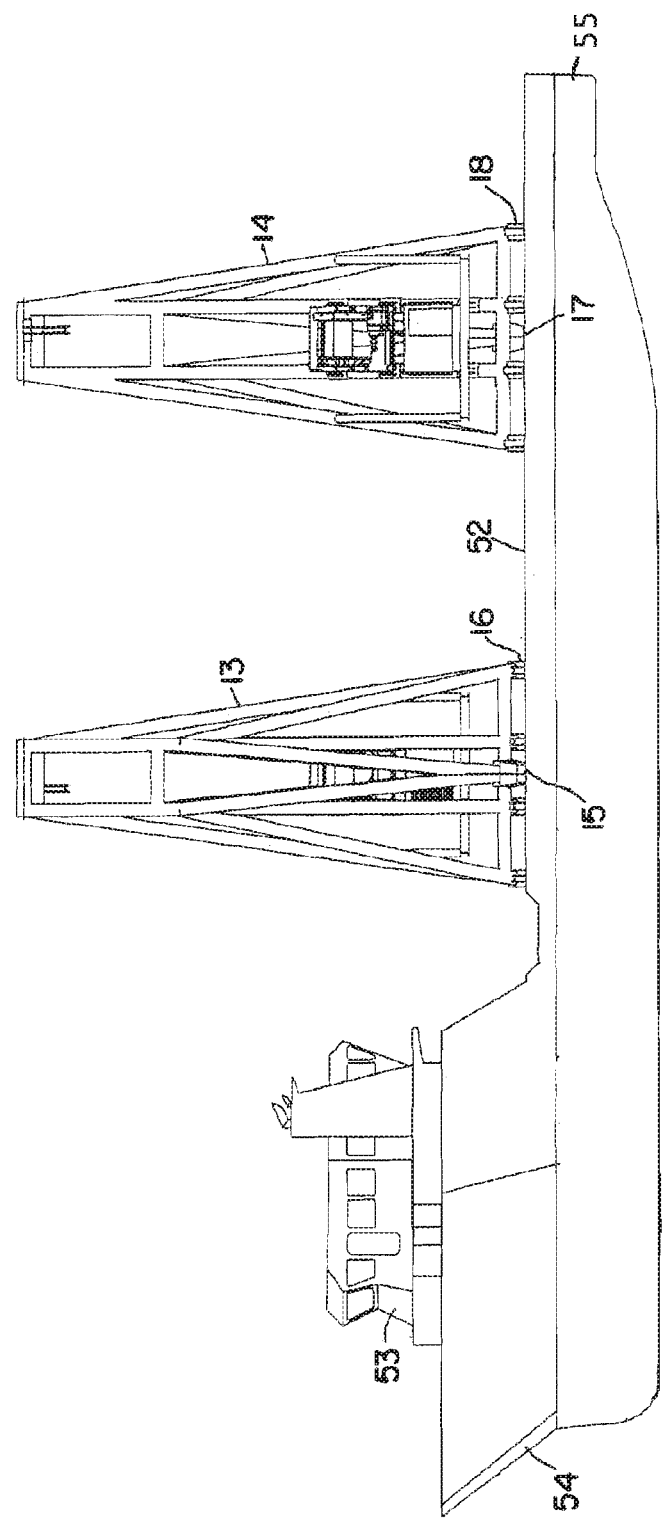
FIG. 6 is an elevation view of the preferred embodiment of the apparatus of the present invention wherein the hulls are dynamically positioned vessels.

FIG. 1 shows the preferred embodiment of the apparatus of the present invention designated generally by the numeral 10. Marine lifting apparatus 10 provides a pair of spaced apart vessels or hulls 11, 12. Hulls 11, 12 can be barges, dynamically positioned vessels (see FIGS. 6-8), or any other buoyant structure. A pair of frames 13, 14 are provided, each frame 13, 14 spanning between the vessels 11, 12. Each frame 13, 14 connects to one vessel 11 or 12 with a universal joint 15 and to the other hull 11 or 12 with a hinged or pinned connection 16.

The frame 13 connects to hull 11 with universal joint 15. The frame 13 connects to vessel 12 with pinned connection or hinge 16. Similarly, the second frame 14 connects to hull 12 with a universal joint 17 and to hull 11 with a hinge or pinned connection 18.

An interface such as a deck beam can be provided on the upper deck 30 of each hull 11, 12 for forming an interface between the frames 13, 14 and the vessels 11, 12. For example, vessel 11 is provided with deck beam 19 that forms an interface between each of the frames 13, 14 and the barge or vessel 11. Deck beam 20 provides an interface between each of the frames 13, 14 and the vessel or barge 12.

Figure 4:
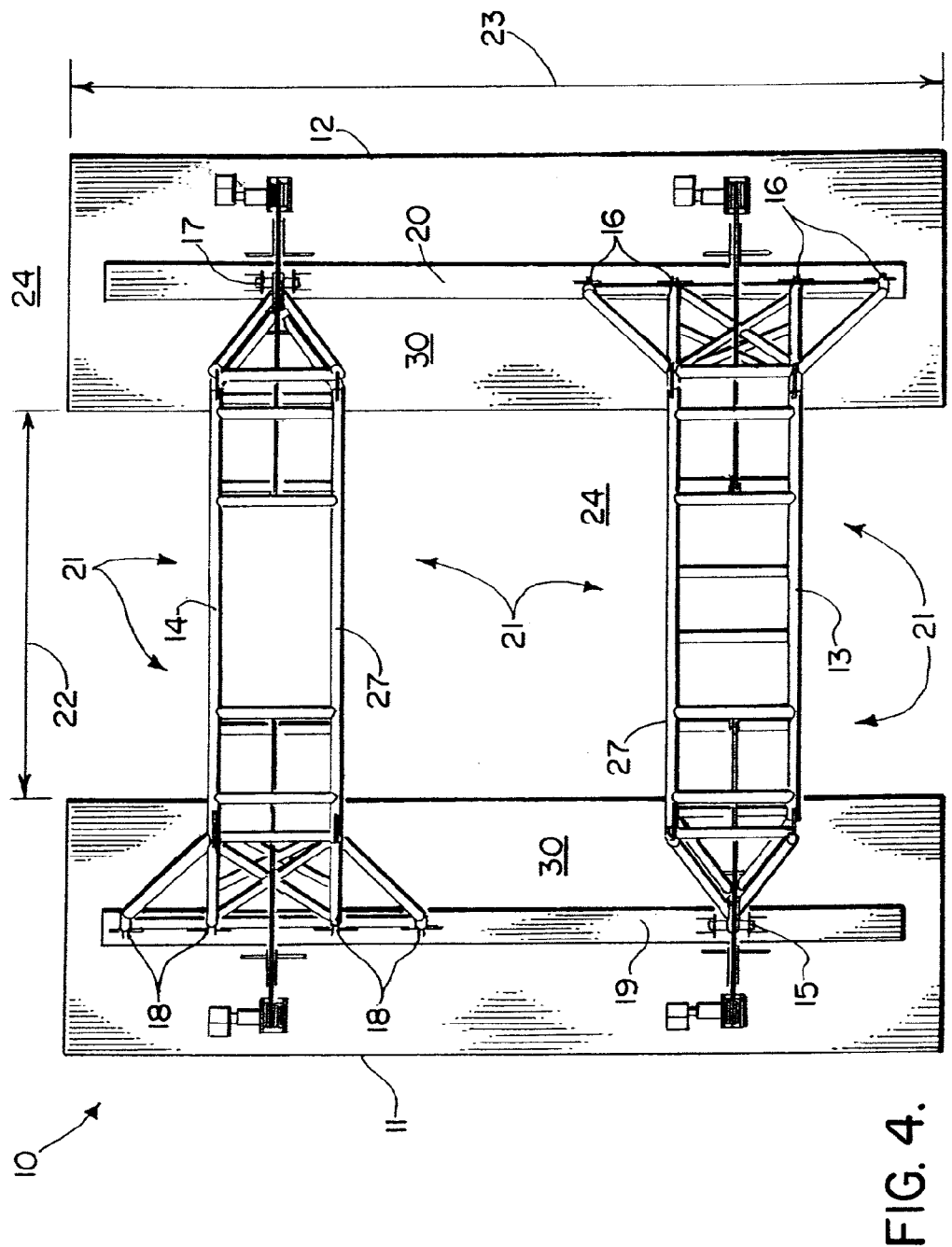
FIG. 4 is a top plan view of the preferred embodiment of the apparatus of the present invention, with each winch and lifting line removed for clarity.
Figure 5:
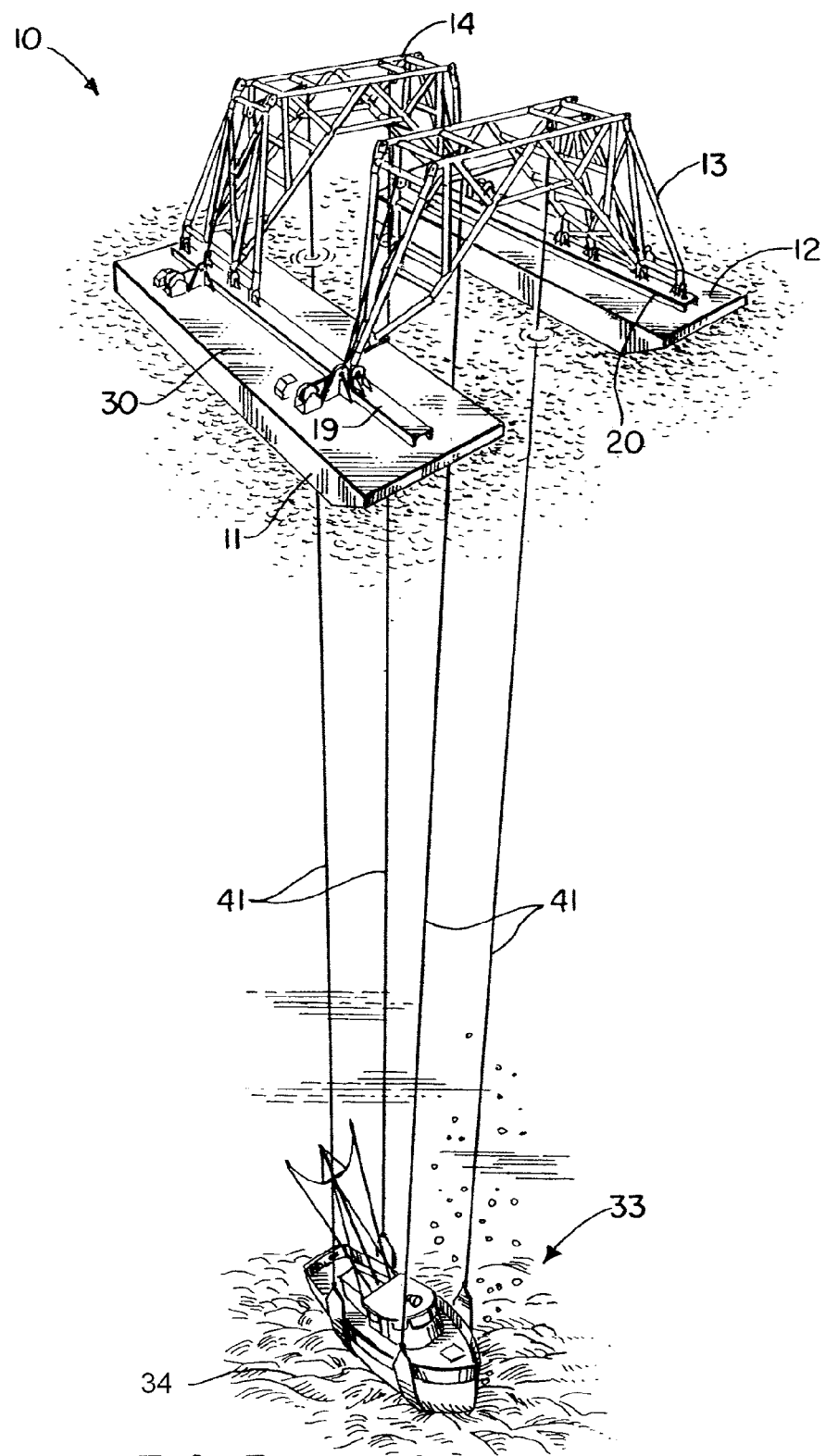
FIG. 5 is a perspective view of the preferred embodiment of the apparatus of the present invention.

In FIGS. 1 and 4, a plan or top view of the apparatus 10 of the present invention is shown with each winch and lifting line removed for clarity. A lifting area 21 is that area that is in between the vessels 11, 12, the area 21 having a length defined by dimension arrow 23 and a width defined by dimension arrow 22 in FIG. 4. This area 21 is sized and shaped to receive a vessel having a cargo to be lifted if that cargo (e.g., deck package) is to be installed. Alternatively, the area 21 can be an area that receives an item to be salvaged from an ocean floor such as a sunken boat or the like. In either case, a clearance is provided above the water surface 24 so that a barge or vessel can be placed under frames 13, 14 to receive the item (e.g., boat 33) that is salvaged from seabed 34.

Figure 3:
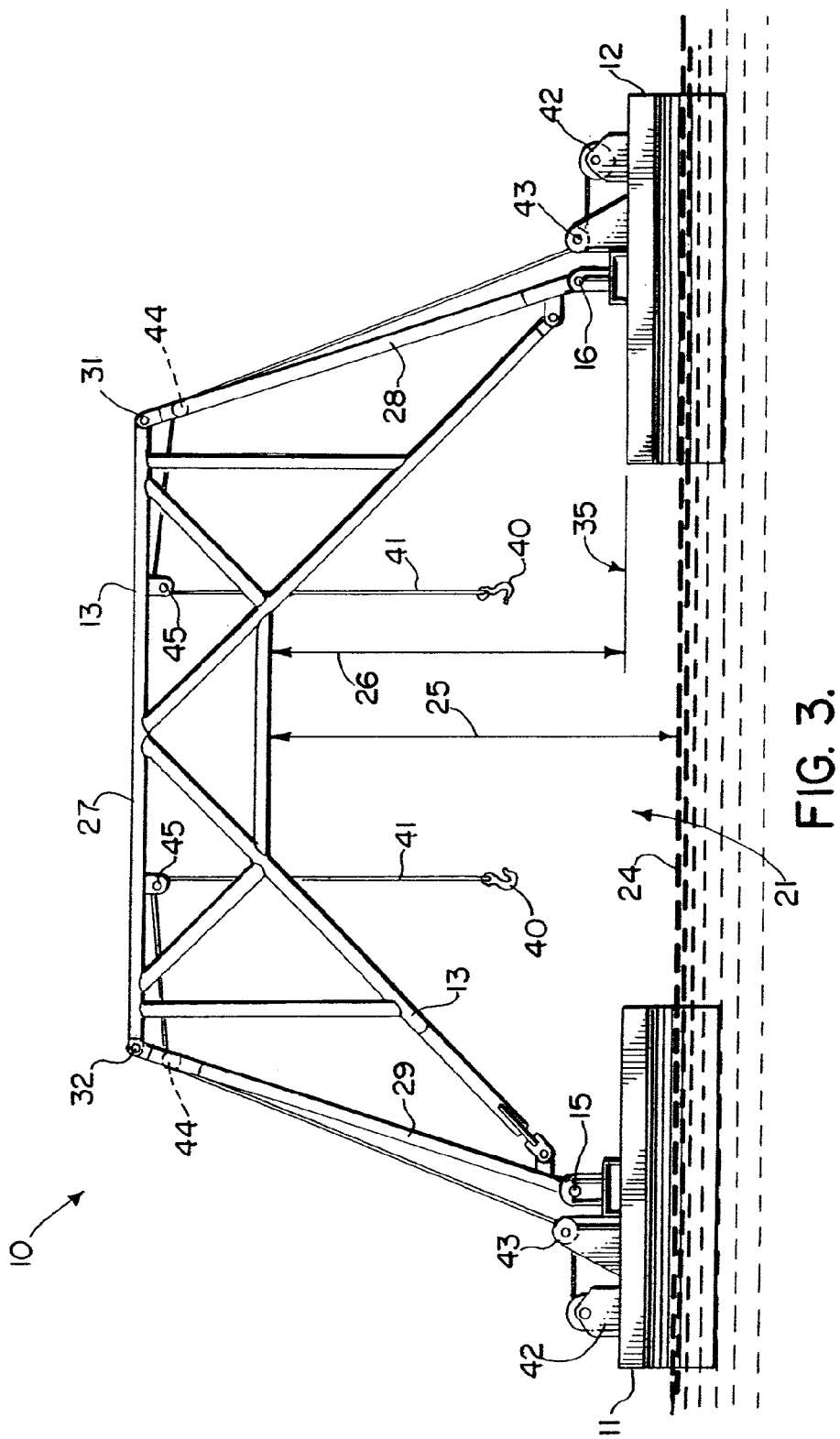
FIG. 3 is an end, elevation view of the preferred embodiment of the apparatus of the present invention.

In FIG. 3, a clearance is indicated schematically by the dimension line 25. Similarly, a clearance 26 is provided above the maximum deck elevation 35 of the hulls 11, 12 as shown in FIG. 3.

Each of the frames 13, 14 can be in the form of a truss as shown. Each frame 13, 14 can thus provide a center truss section 27, a smaller side truss section 28 and another smaller side truss section 29. Pinned connections 31, 32 can be provided for attaching the smaller truss sections 28, 29 to the larger center truss section 27 as shown in FIG. 3. For the frame of FIGS. 2-5, slings (not shown) can optionally be provided for connecting the center section 27 to the lower end portion of each of the smaller truss sections 28, 29. Shackles can be used to attach any slings to eyelets or padeyes on the center section 27. Likewise, shackles can be used to attach the slings to eyelets or padeyes or other attachments on the smaller truss sections 28, 29.

One or more hooks 40 or other lifting fitting can be attached to a lifting line 41 and payed out from winch 42. Sheaves 43, 44, 45 as needed can be used to route the line 41 from winch 42 to hook 40. Line 41 can be a multiple line assembly to increase lift capacity. Hook 40 can be any lifting fitting such as any known crown block, for example.

Figure 7:
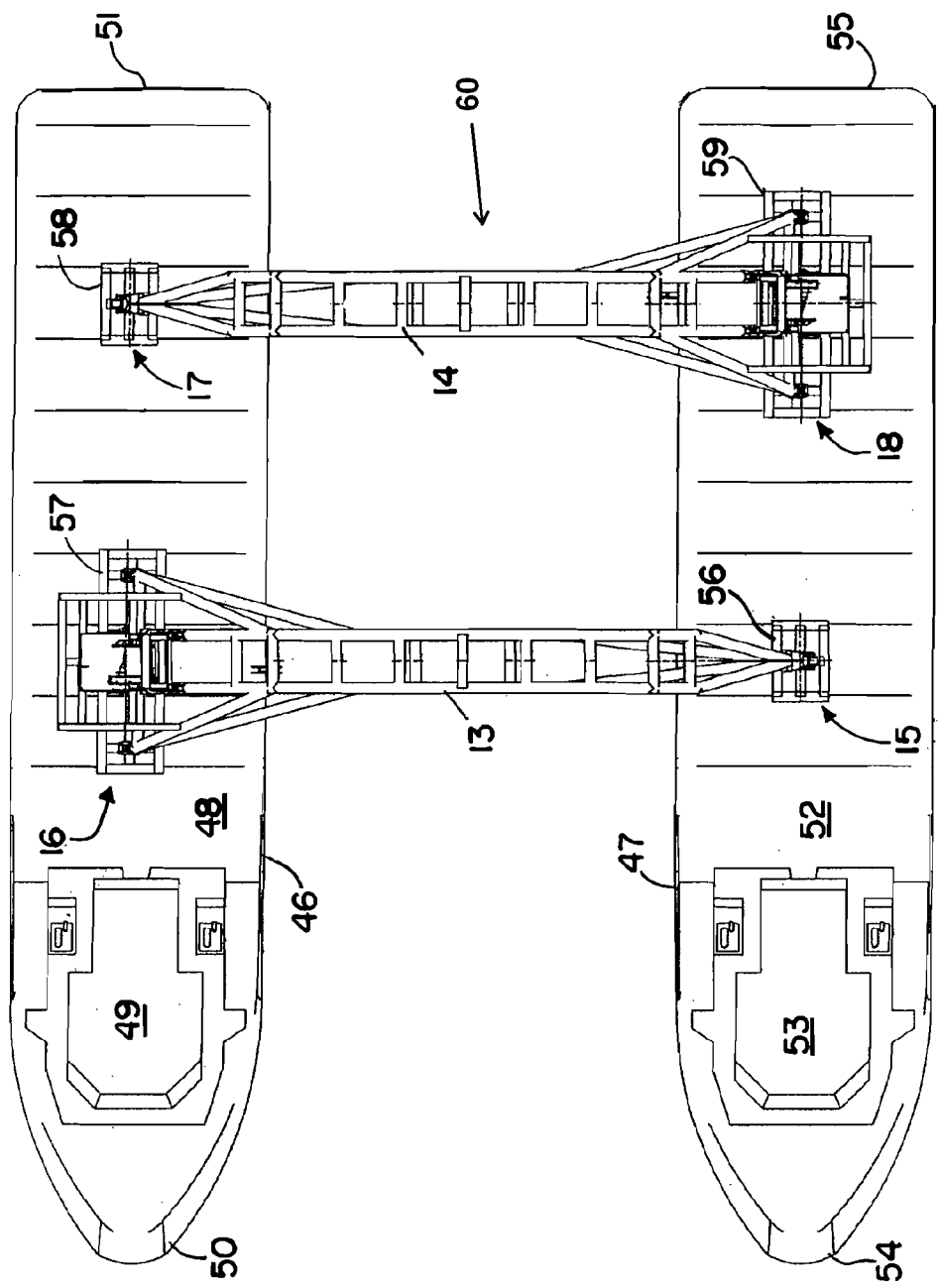
FIG. 7 is a plan view of the preferred embodiment of the apparatus of the present invention wherein the hulls are dynamically positioned vessels.
Figure 8:
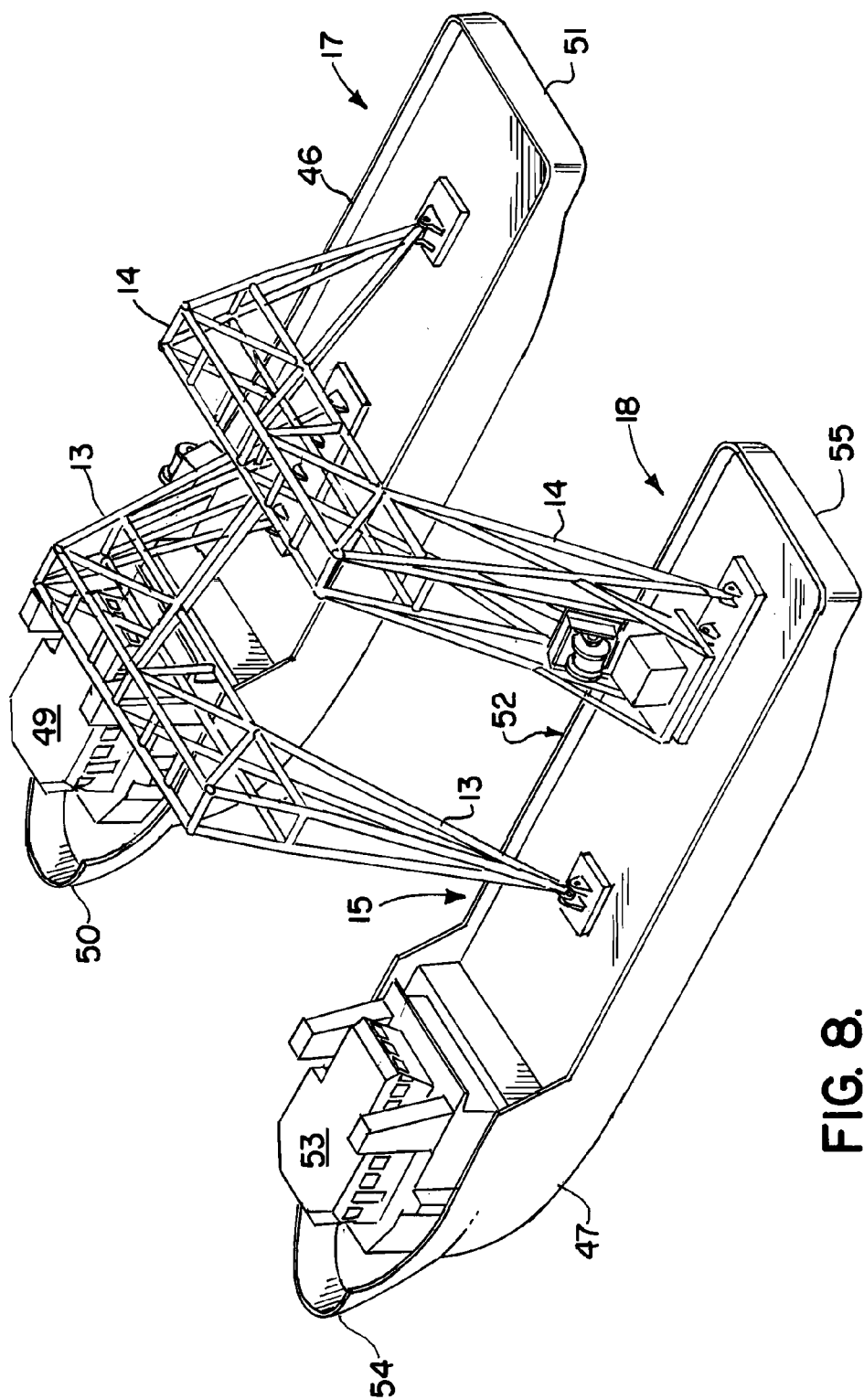
FIG. 8 is a perspective view of a preferred embodiment of the apparatus of the present invention wherein the hulls are dynamically positioned vessels.

FIGS. 7-8 illustrate that dynamically positioned vessels 46, 47 can be used to support frames 13, 14. Dynamically positioned vessels 46, 47 are commercially available and are known. Dynamic positioning systems for vessels are commercially available. An example is the Kongsberg Simrad SBP10 work station. Such vessels 46, 47 can maintain a position even without the use of anchors. Dynamic positioning is a computer controlled system to automatically maintain a vessel's position and heading by using the vessel's own propellers and/or thrusters. Position reference sensors, combined with wind sensors, motion sensors and gyro compasses provide information to the computer pertaining to the vessels position and the magnitude and direction of the environmental forces affecting its position. Typically, a computer program contains a mathematical model of the vessel that includes information pertaining to wind and current drag of the vessel and the location of the thrusters. This knowledge, combined with the sensor information allows the computer to calculate the required steering angle and/or thruster output for each thruster. This allows operations at sea while mooring or anchoring is not feasible due to deep water, congestion on the sea bottom (pipelines, templates) or other problems.

Dynamic positioning may either be absolute in that the position is locked to a fixed point over the bottom, or relative to a moving object like another ship or an underwater vehicle. One may also position the ship at a favorable angle towards the wind, waves and current, called weathervaning. Dynamic position is much used in the offshore oil industry. There are more than 1,000 dynamic positioning ships in existence.

In FIGS. 7-8, dynamically positioned vessels 46, 47 each have a deck, pilot house or cabin, bow and stern. The dynamically positioned vessel 46 provides deck 48, pilot house 49, bow 50 and stern 51. Dynamically positioned vessel 47 provides a deck 52, pilot house 53, bow 54, stern 55.

Load spreader platforms can be provided to define an interface between each of the frames 13, 14 and the dynamically positioned vessels 46, 47. Load spreader platform 56 is positioned under articulating connection 15 while load spreader platform 57 is positioned under hinge or pinned connection 16. Load spreader platform 58 is positioned under articulating connection 17, forming an interface between that connection 17 and the deck 48 of vessel 46. Similarly, load spreader platform 59 forms an interface between deck 52 of vessel 47 and hinged or pinned connection 18 as shown in FIGS. 5-8.

In the preferred embodiment, the frames 13, 14 are positioned in between the pilot house of each dynamically positioned vessel and the stern of each dynamically positioned vessel as shown in FIG. 7. In the preferred embodiment, the dynamically positioned vessels 46, 47 are positioned so that both vessels 46, 47 have the bow 50, 54 pointed in the same direction and the stern 51, 55 pointed in the same direction, as shown in FIGS. 7-8.

Figure 9:
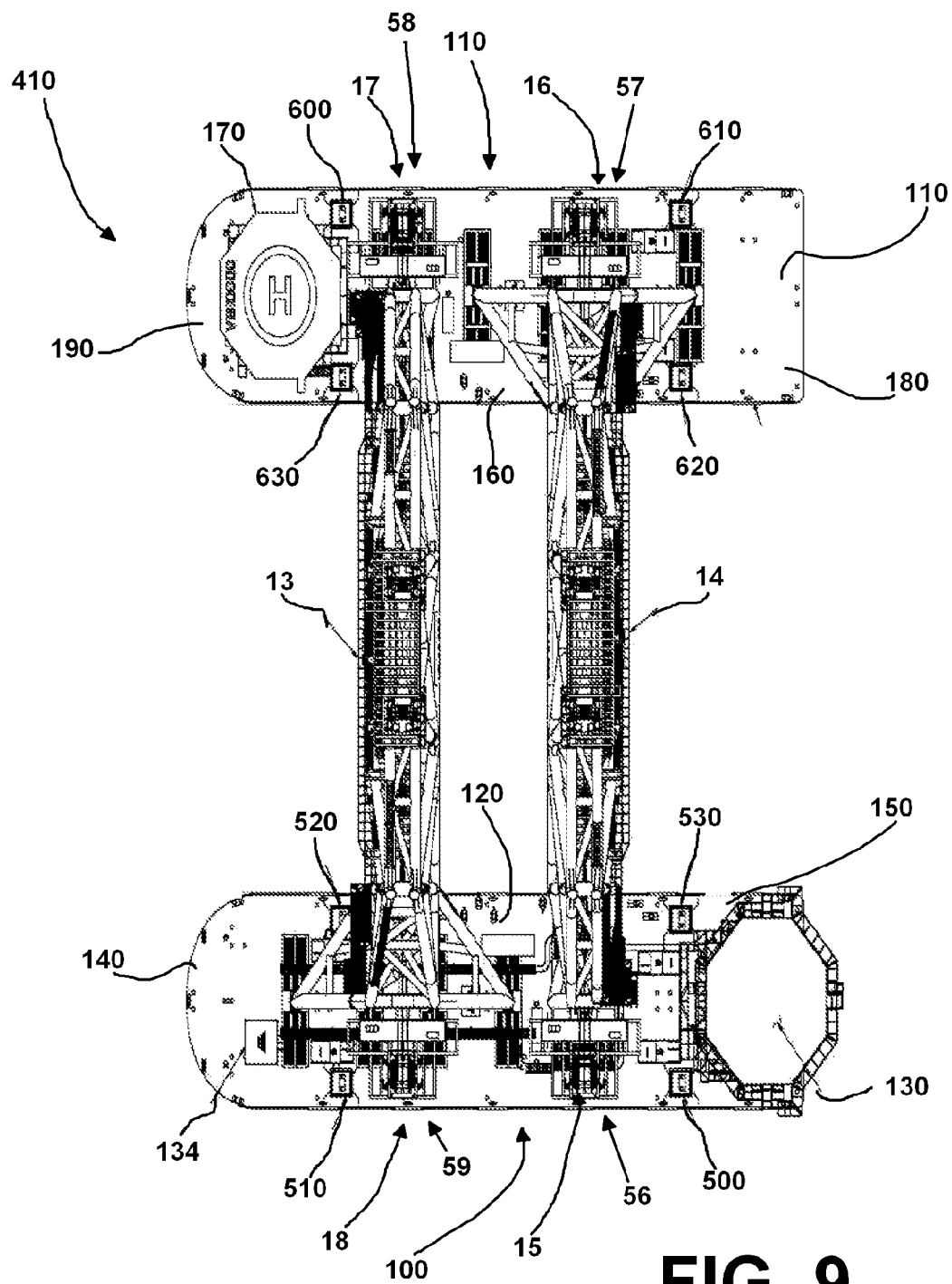
FIG. 9 is a plan view of one embodiment of the method and apparatus of the present invention.
Figure 10:
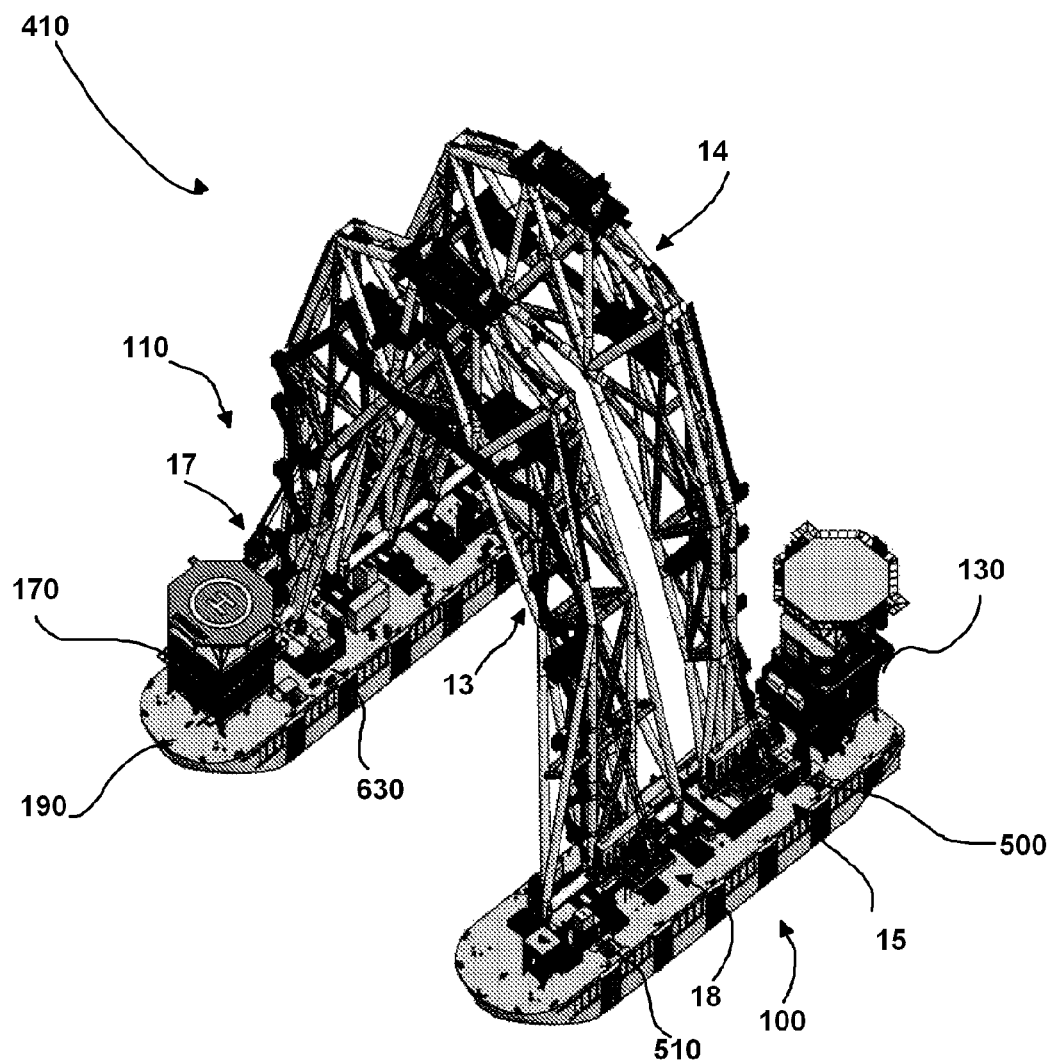
FIG. 10 is a perspective view of one embodiment of the method and apparatus of the present invention.

As with the preferred embodiment of FIGS. 1-5, each frame 13, 14 can be provided with a winch 42 and multiple sheaves 43-45 and lifting line 41 with hook 40 and any other suitable rigging that enables the frames 13, 14 to lift objects from the seabed 34 or to support items in between the dynamically positioned vessels 46, 47 in load area 60 and under frames 13, 14. FIG. 9 is a plan view of one embodiment of method and apparatus 410 of the present invention. FIG. 10 is a perspective view of one embodiment of combined vessel 410.

In FIGS. 9 and 10, dynamically positioned vessels 100, 110 each have a deck, pilot house or cabin, bow and stern. The dynamically positioned vessel 100 provides deck 120, pilot house 130, bow 140 and stern 150. Dynamically positioned vessel 110 provides a deck 160, pilot house 170, bow 180, stern 190.

Load spreader platforms can be provided to define an interface between each of the frames 13, 14 and the dynamically positioned vessels 100, 110. Load spreader platform 56 is positioned under articulating connection 15 while load spreader platform 57 is positioned under hinge or pinned connection 16. Load spreader platform 58 is positioned under articulating connection 17, forming an interface between that connection 17 and the deck 160 of vessel 110. Similarly, load spreader platform 59 forms an interface between deck 120 of vessel 100 and hinged or pinned connection 18 as shown in FIGS. 9 and 10.

FIG. 11 is a perspective view of one embodiment of a retrofit base 200 for the method and apparatus designed specially to be used to retrofit existing vessels, such as work barges. Base 200 can include surface 220 and plurality of connections 210. Base 200 can also include plurality of connections points 230 for connecting to frames 13 and 14.

Different existing vessels have different configurations and different locations of structural supporting points. FIG. 12 is a plan view of the base 200. FIG. 13 is a side view of base 200.

Figure 17:
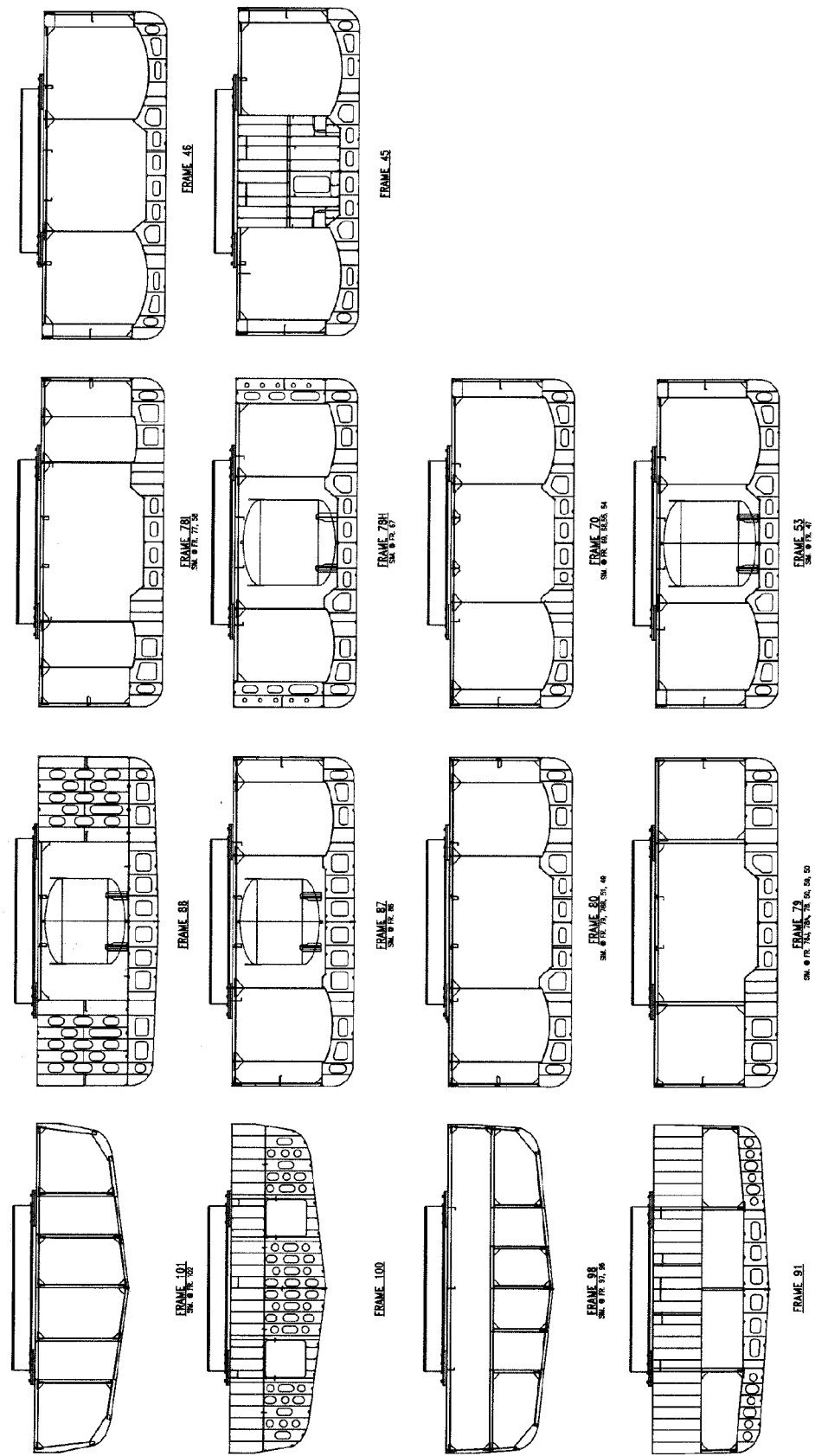
FIG. 17 shows a plurality of cross sections of hulls on which a universal retrofitting base can be used.

Base 200 can include a plurality of connection points or plates 210 for connecting to frames 13,14 which connection points have been located to adequately connect frames 13,14 at the proper spaced apart distance. Plurality of connection points 210 can be used to connect to the myriad of configurations seen on existing vessels. FIG. 17 shows a plurality of cross section of hulls on which retrofitting base can be used. A portion of the decking material for the existing vessel can be removed and plurality of connection points can be connected to the structural support members of the existing vessel.

In one embodiment the plurality of connecting points plates or members 210 are adjustable relative to base 200. In one embodiment a base 200 can be designed to have connecting points 210 at specific locations to fit a particular existing vessel of a particular construction. Connecting plates 210 can be structurally attached to the structure support areas of an existing vessel, such as structurally connected to the hull of the existing vessel.

Figure 14:
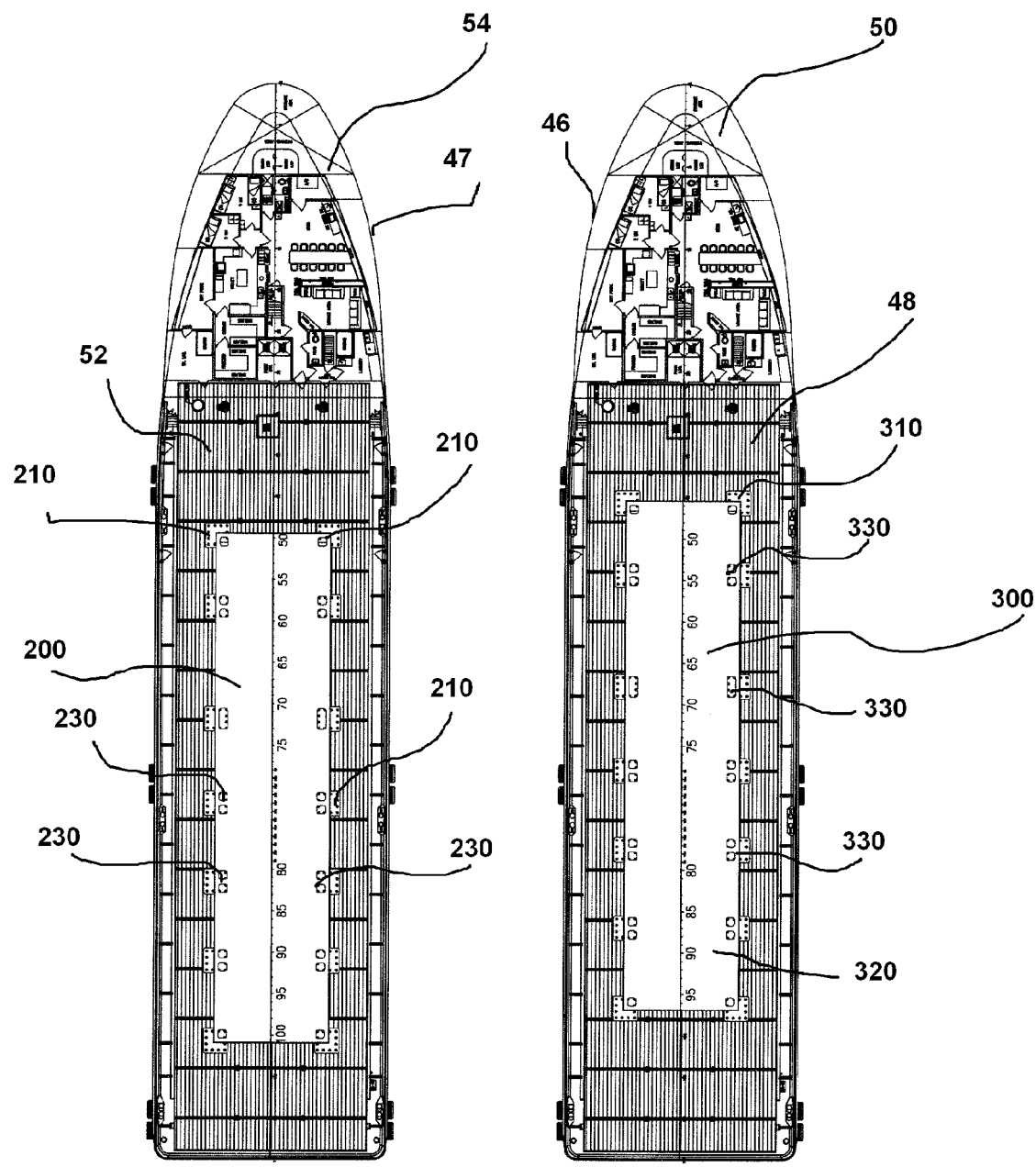
FIG. 14 is a plan view of one embodiment of the method and apparatus with a universal retrofit base for retrofitting existing offshore supply vessels to implement the method and apparatus.

FIG. 14 is a plan view of one embodiment where two retrofitting bases 200, 300 have been attached to two existing vessels 46,47. Base 300 can be substantially similar to base 200. Base 300 can include surface 320 and plurality of connections 310. Base 300 can also include plurality of connections points 330 for connecting to frames 13 and 14. Alternatively, base 300 can be specially designed to attached to the structural attachments of existing vessel 46 which attachment points do not have the same spatial separation as the attachment points in vessel 47. To attach the bases part of the wood decking can be removed to obtain access to the underlying support structure of each vessel.

Figure 15:
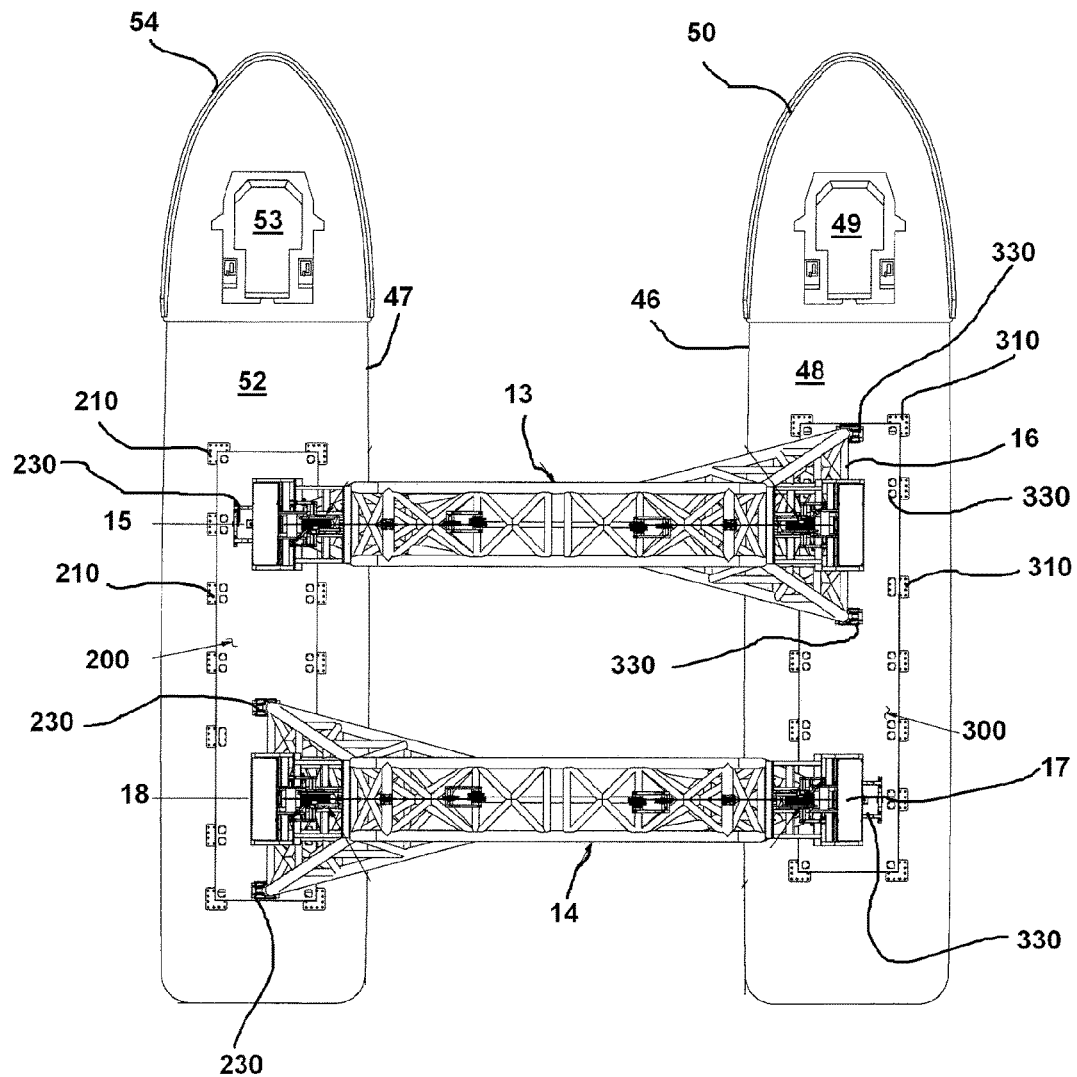
FIG. 15 is a plan view of one embodiment of the method and apparatus with a universal retrofit base for retrofitting existing offshore supply vessels to implement the method and apparatus.
Figure 16:
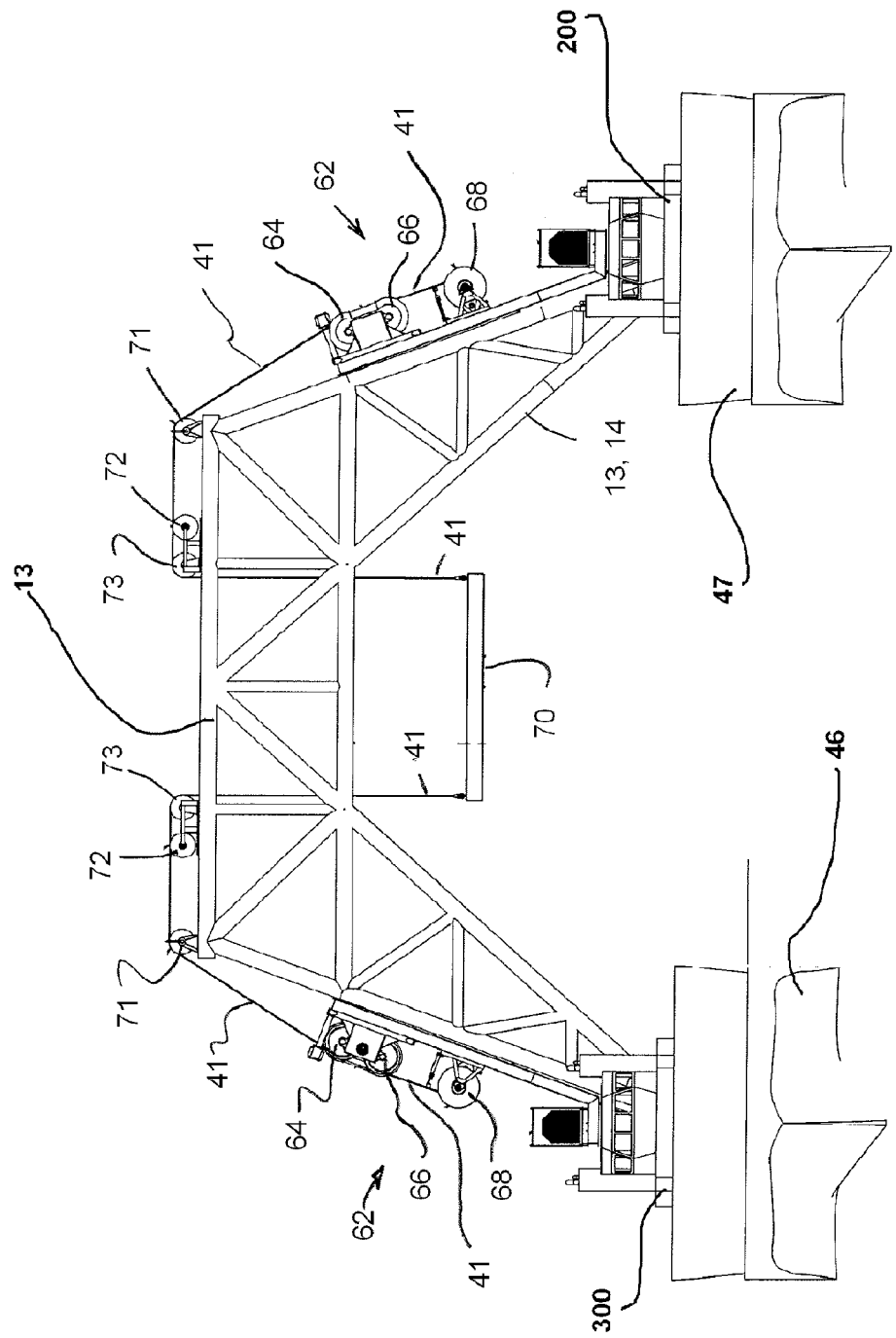
FIG. 16 is a side view of the embodiment of FIG. 15 with a universal retrofit base for retrofitting existing offshore supply vessels to implement the method and apparatus.

FIG. 15 is a plan view of one embodiment where frames 13 and 14 have been attached to both bases 200 and 300 which now structurally integrate existing vessel 46 and 47. FIG. 16 is a side view of structurally integrated vessels 46 and 47. In FIG. 16, the winches can be traction winches 62 (e.g. hydraulic traction winches). Generally speaking, traction winches and hydraulic traction winches are commercially available. Each traction winch 62 is mounted on a frame 13 or 14. In FIG. 16, each traction winch 62 can include a first drum 64, second drum 66 and third drum 68. Each drum 64, 66, 68 is preferably mounted on a frame 13 or 14 as seen in FIG. 16. Line 41 can be wound upon the first drum 64 one, two, three, four or more times. From drum 64, line 41 is routed to drum 66 and then would upon drum 66 one, two, three, four or more times. The third drum 68 is a spooling drum sized and shaped to carry many winds of the line 41. In this fashion, first and second drums 64 and 66 are used to carry the load of line 41 and a spreader bar 70 or other rigging that connects line 41 to the load or package to be lifted or salvaged from a sea bottom or sea bed. As with other embodiments, line 41 is rigged to one or more sheaves or rollers 71, 72, 73. Each sheave or roller 71, 72, 73 is attached to a frame 13 or 14. Lifting line 41 can have a buoyancy under water of between about minus five (−5.0) and 10 pounds per foot (14.88 kg/m). Alternatively, lifting line 41 can have a buoyancy under water of between about minus five (−5.0) and 100 pounds per foot (148.81 kg/m). The buoyance under water of the line 41 can be between about minus two (−2.0) and two (2.0) pounds per foot (2.98 kg/m). In one embodiment, line 41 can be neutral buoyancy line in water. The line 41 can be a synthetic material such as a rope made with ultra high molecular weight polyethylene fiber (UHMWPE), such as rope sold under the trademark Dyneema.

Dynamic Positioning System

Figure 18:
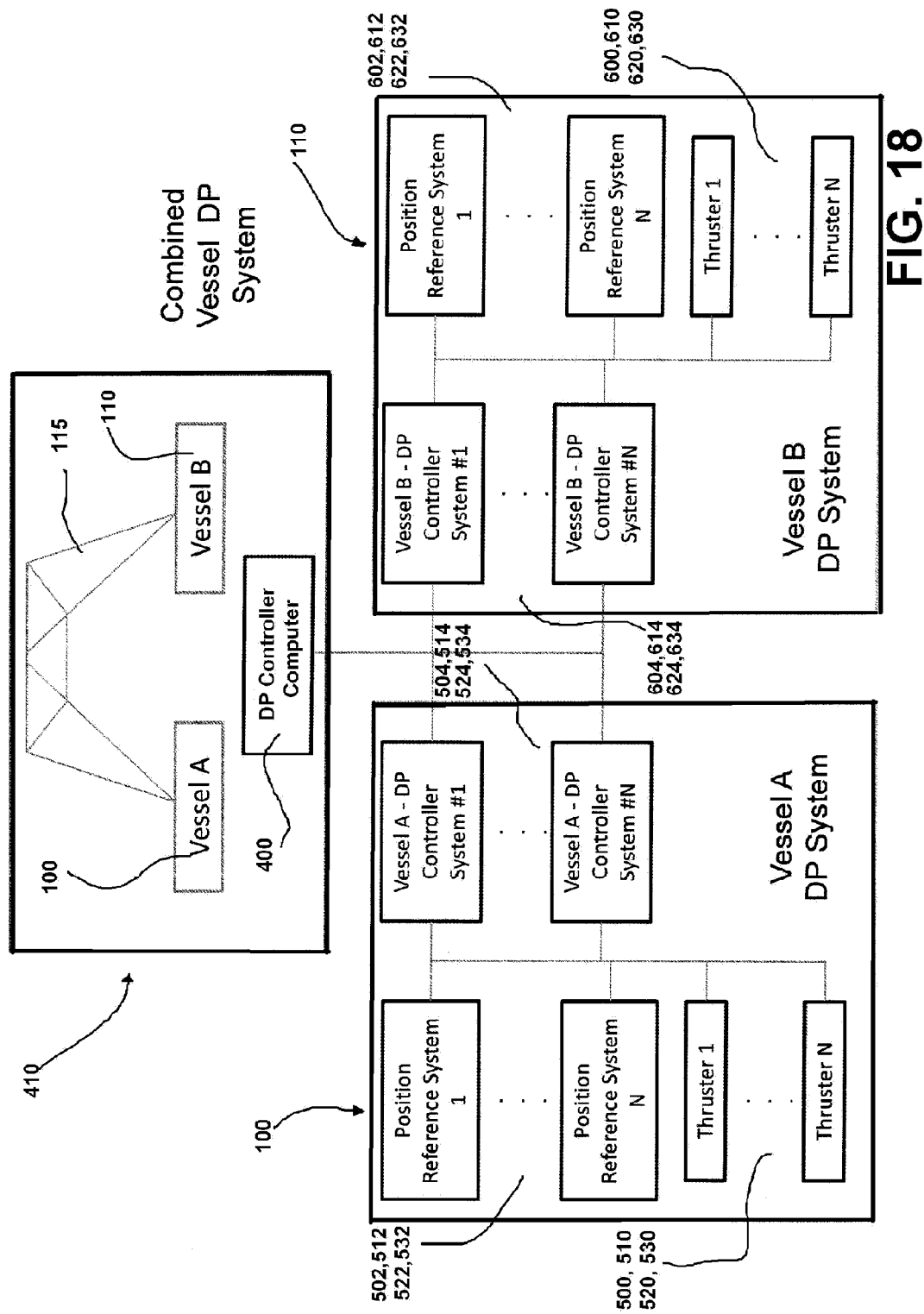
FIG. 18 is a schematic diagram of one embodiment of the method and apparatus incorporating a combined vessel DP system.

FIG. 18 is a schematic diagram of an overall structurally integrated vessel 410 schematically showing the integration of vessel 100 and 110 incorporating an overall combined vessel DP system 400. As used herein, "DP" means dynamically positioned".

Figure 19:
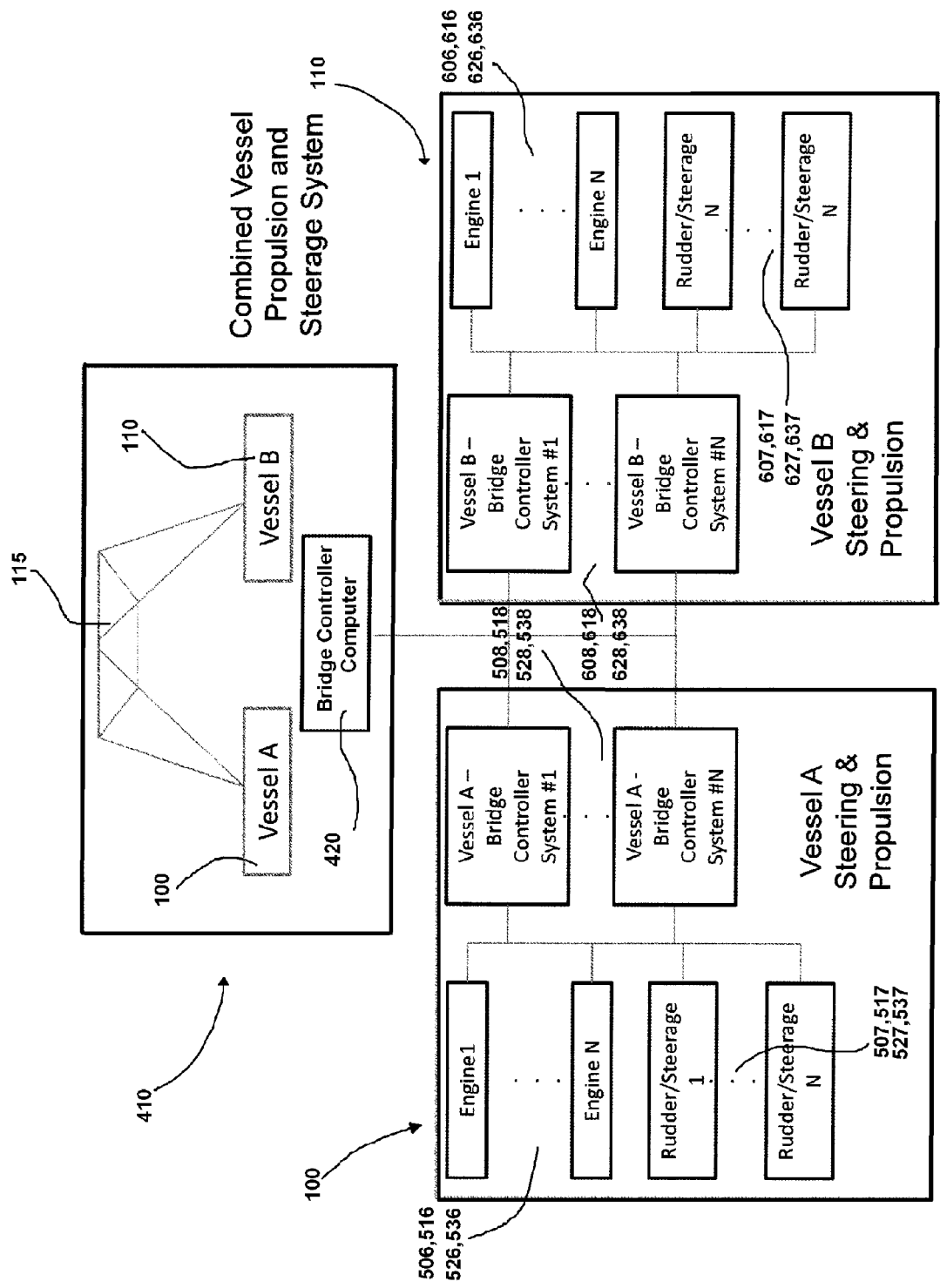
FIG. 19 is a schematic diagram of one embodiment of the method and apparatus incorporating a combined vessel propulsion and steerage system.

FIG. 19 is a schematic diagram of an overall structurally integrated vessel 410 schematically showing the integration of vessel 100 and vessel 110 and incorporating an overall combined vessel propulsion and steerage system 420.

In one embodiment gantry 115 can be used to structural couple two existing vessels 100, 110 (ships, supply boats, etc.). The coupled vessels 100, 110 can provide:

(a) a structural foundation for the gantry system 115 for lifting operations;
(b) personnel housing;
(c) propulsion for combined system travel; and
(d) position keeping through the use of dynamic positioning.

Structurally integrating two existing stand along vessels 100 and 110 (having conventional propulsion and dynamic positioning systems) thereby forming a single overall vessel/system 410, can enhance the performance of both the propulsion and the dynamic positioning systems for the two integrated vessel/system. For example, structurally integrating two existing vessels (each having a class of DP system such as DP class 1) will cause the DP system of the structurally integrated vessel to be a higher class such as DP 2 (because the combined/integrated vessels, propulsion systems, and DP systems form a single integrated system).

The performance of the propulsion system for the combined system will also be superior when compared to the performance of the existing individual vessels.

For example, the structurally combined and integrated vessel system will have multiple independently operable engine rooms and multiple fuel supplies, thereby providing greater propulsion redundancy. The loss of one of the main engine rooms due to flood or fire, or the contamination of an engine room fuel supply on one of the vessels will no longer result in the loss of propulsion for the combined system as the redundant engine room will still be operable.

Similarly, steerage for the structurally combined and integrated vessel system can still be achieved given the loss of steerage (rudder or equivalent system) on one of the individual vessels.

All of the above make the performance of the combined system superior to the performance of the existing individual systems without fundamental change or modification to the individual vessels. It is structurally combining and integrating the vessels through the use of bottom feeder gantries which lead to the performance improvements.

Supporting Data

The "quality" of a dynamic positioning system can be measured via the following:

Robustness of the system. This is a measure of how many components within the DP system can fail and the DP system remain able to maintain station keeping capabilities. The international standard for this is to assign a rating or classification to the DP system. Generally, there are three ratings: Class 1, Class 2 and Class 3. Higher classes of DP system have greater degrees of design redundancy and component protection.

Through the integration of two lower level DP class vessels will automatically result in higher levels of component and system redundancy.

The ability of the system to maintain station within a given set of wind, wave, and current conditions is generally referred to as "Capability." The higher the "Capability" of a vessel, the worse the conditions the vessel can stay on location during such conditions. "Capability" itself is a function of:

thruster horsepower (or equivalent), numbers of thrusters, and disposition (location) of thrusters around the vessel which will influence a thrusters ability to provide restoring force capability.

Through the structural combination and integration of two vessels of given "capabilities", the "Capability" of the structurally combined and integrated vessel is increased compared to the "capability" of either vessel before such combination and integration. Increased "Capability" will be the result of:

(a) there being more thrusters in the structurally combined and integrated system, and (b) the thrusters having a better spatial distribution in the structurally combined and integrated system (meaning that the thrusters can provide a greater restoring capability to the combined and integrated system compared to either vessel alone).

Additionally, the capability of the overall DP system in the structurally combined and integrated vessel will be superior even given the loss of one of the components of one of the DP systems in one of the vessels for the same reasons as specified in (a) and (b) above.

Damaged system capability is also another recognized measure of DP system quality.

Structurally Combined and Integrated First and Second Vessels to Create a Singled Combined Vessel DP Combination In one embodiment a first vessel 100 and a second vessel 110 are structurally combined and integrated, the (1) first vessel 100 comprising:
 (a) a hull,
 (b) a thruster 500, 510, 520, 530 for the first vessel powering the hull of the first vessel,
 (c) a position reference system 502, 512, 522, 532 for the first vessel providing the position of the first vessel, and
 (d) a DP controller system 504, 514, 524, 534 for the first vessel operatively connected to the first thruster 500, 510, 520, 530 of the first vessel and first position referencing system 502, 512, 522, 532 of the first vessel;

(2) second vessel 110 comprising:
 (a) a hull,
 (b) a thruster 600, 610, 620, 630 for the second vessel powering the hull of the second vessel,
 (c) a position referencing system 602, 612, 622, 632 for the second vessel providing the position of the second vessel,
 (d) a DP controller system 604, 614, 624, 634 for the second vessel operatively connected to the thruster 600, 610, 620, 630 for the second vessel and position referencing system 602, 612, 622, 632 for the second vessel;
and
 including an overall DP controller system 400 operatively connected to both the DP controller system 504, 514, 524, 534 for the first vessel and the DP controller system 604, 614, 624, 634 for the second vessel, wherein the overall DP controller system 400 can directly or indirectly control one or more of the following:
 (I) thruster 500, 510, 520, 530 for the first vessel,
 (ii) position referencing system 502, 512, 522, 532 for the first vessel,
 (iii) thruster 600, 610, 620, 630 for the second vessel, and
 (iv) position referencing system 602, 612, 622, 632 for the second vessel.

In one embodiment the first and/or second vessels are used vessels and taken out of service to be structurally combined and integrated.

In one embodiment a first vessel 100 and a second vessel 110 are structurally combined and integrated, the (1) first vessel 100 comprising:
 (a) a hull,
 (b) a plurality of thrusters for the first vessel, each powering the hull of the first vessel,
 (c) a plurality of position referencing systems for the first vessel, each providing the position of the first vessel, and
 (d) a plurality of DP controller systems for the first vessel, each being operatively connected to the plurality of thrusters for the first vessel and plurality of position referencing systems for the first vessel;

(2) second vessel 110 comprising:
 (a) a hull,
 (b) a plurality of thrusters for the second vessel, each powering the hull of the second vessel,
 (c) a plurality of position referencing systems for the second vessel, each providing the position of the second vessel,
 (d) a plurality of DP controller systems for the second vessel, each being operatively connected to the plurality of thrusters for the second vessel and plurality of position referencing system for the second vessel;
and
 having an overall DP controller operatively connected to both the DP controller for the first vessel and the DP controller for the second vessel wherein the DP controller can directly or indirectly control any of the following:
 (I) one or more of the thrusters for the first vessel,
 (ii) one or more of the position referencing systems for the first vessel,
 (iii) one or more of the thrusters for the second vessel, and
 (iv) one or more of the position referencing systems for the second vessel.

Steering and Propulsion Combination (FIG. 19)

In one embodiment a first vessel and a second vessel are structurally combined and integrated, the (1) first vessel 100 comprising:
- (a) a hull,
- (b) an engine 506, 516, 526, 536 for the first vessel 100 powering the hull of the first vessel, and
- (c) a steerage system 507, 517, 527, 537 for the first vessel steering the first vessel;
- (d) a bridge controller system 508, 518, 528, 538;

(2) second vessel 110 comprising:
- (a) a hull,
- (b) an engine 606, 616, 626, 636 for the second vessel powering the hull of the second vessel, and
- (c) a steerage system 607, 617, 627, 637 for the second vessel steering the second vessel;
- (d) a bridge controller system 608, 618, 628, 638;

and including an overall bridge controller computer 420 operatively connected to each of the engine 506, 516, 526, 536 for the first vessel, steerage system 507, 517, 527, 537 for the first vessel, engine 606, 616, 626, 636 for the second vessel, and steerage system 607, 617, 627, 637 for the second vessel, wherein the overall bridge controller computer can directly or indirectly control one or more of the following:
- (I) engine 506, 516, 526, 526 for the first vessel,
- (ii) steerage system 507, 517, 527, 537 for the first vessel,
- (iii) engine 606, 616, 626, 636 for the second vessel, and
- (iv) steerage system 607, 617, 627, 637 for the second vessel.

In one embodiment the overall bridge controller is located on one of the two vessels.

In one embodiment the first and/or second vessels are used vessels and taken out of service to be structurally combined and integrated.

In one embodiment a first vessel and a second vessel are structurally combined and integrated, the (1) first vessel 100 comprising:
- (a) a hull,
- (b) a plurality of engines for the first vessel, each powering the hull of the first vessel, and
- (c) a plurality of steerage systems for the first vessel, each steering the first vessel;

(2) second vessel 110 comprising:
- (a) a hull,
- (b) a plurality of engines for the second vessel, each powering the hull of the second vessel, and
- (c) a plurality of steerage systems for the second vessel, each steering the second vessel, and including an overall bridge controller computer operatively connected to each of the engines for the first vessel, steerage systems for the first vessel, engines for the second vessel, and steerage systems for the second vessel, wherein the overall bridge controller computer can directly or indirectly control the following:
- (I) one or more of the engines for the first vessel,
- (ii) one of more of the steerage systems for the first vessel,
- (iii) one or more of the engines for the second vessel, and
- (iv) one or more of the steerage systems for the second vessel.

The following is a list of parts and materials suitable for use in the present invention.

| PARTS LIST | |
|---|---|
| Part Number | Description |
| 10 | marine lifting apparatus |
| 11 | vessel/hull |
| 12 | vessel/hull |
| 13 | frame |
| 14 | frame |
| 15 | universal joint |
| 16 | hinge |
| 17 | universal joint |
| 18 | hinge |
| 19 | deck beam/interface |
| 20 | deck beam/interface |
| 21 | area |
| 22 | dimension |
| 23 | dimension |
| 24 | water surface |
| 25 | clearance above water |
| 26 | clearance above hull deck |
| 27 | center truss section |
| 28 | smaller truss section |
| 29 | smaller truss section |
| 30 | hull deck |
| 31 | pinned connection |
| 32 | pinned connection |
| 33 | sunken boat |
| 34 | seabed |
| 35 | maximum deck elevation |
| 40 | lifting hook |
| 41 | lifting line |
| 42 | winch |
| 43 | sheave |
| 44 | sheave |
| 45 | sheave |
| 46 | dynamically positioned vessel |
| 47 | dynamically positioned vessel |
| 48 | deck |
| 49 | pilot house |
| 50 | bow |
| 51 | stern |
| 52 | deck |
| 53 | pilot house |
| 54 | bow |
| 55 | stern |
| 56 | load spreader platform |
| 57 | load spreader platform |
| 58 | load spreader platform |
| 59 | load spreader platform |
| 60 | load area |
| 62 | traction winch |
| 64 | first drum |
| 66 | second drum |
| 68 | third drum |
| 70 | spreader bar/rigging |
| 100 | dynamically positioned vessel |
| 110 | dynamically positioned vessel |
| 115 | gantry structurally combining vessels |
| 120 | deck |
| 130 | pilot house |
| 134 | secondary control building |
| 140 | bow |
| 150 | stern |
| 160 | deck |
| 170 | pilot house |
| 180 | bow |
| 190 | stern |
| 200 | universal load spreader platform/retrofit base |
| 210 | plurality of connection plates |
| 220 | surface |
| 230 | plurality of connection points for spreader gantry |
| 300 | universal load spreader platform/retrofit base |
| 310 | plurality of connection plates |
| 320 | surface |
| 330 | plurality of connection points for spreader gantry |
| 400 | overall DP Controller computer |

-continued

PARTS LIST

| Part Number | Description |
| --- | --- |
| 410 | structurally integrated and combined vessel |
| 420 | bridge controller computer |
| 500 | DP controlled thruster |
| 502 | position referencing system |
| 504 | DP controller |
| 506 | engine |
| 507 | rudder steerage |
| 508 | vessel bridge controller |
| 510 | DP controlled thruster |
| 512 | position referencing system |
| 514 | DP controller |
| 516 | engine |
| 517 | rudder steerage |
| 518 | vessel bridge controller |
| 520 | DP controlled thruster |
| 522 | position referencing system |
| 524 | DP controller |
| 526 | engine |
| 527 | rudder steerage |
| 528 | vessel bridge controller |
| 530 | DP controlled thruster |
| 532 | position referencing system |
| 534 | DP controller |
| 536 | engine |
| 537 | rudder steerage |
| 538 | vessel bridge controller |
| 600 | DP controlled thruster |
| 602 | position referencing system |
| 604 | DP controller |
| 606 | engine |
| 607 | rudder steerage |
| 608 | vessel bridge controller |
| 610 | DP controlled thruster |
| 612 | position referencing system |
| 614 | DP controller |
| 616 | engine |
| 617 | rudder steerage |
| 618 | vessel bridge controller |
| 620 | DP controlled thruster |
| 622 | position referencing system |
| 624 | DP controller |
| 626 | engine |
| 627 | rudder steerage |
| 628 | vessel bridge controller |
| 630 | DP controlled thruster |
| 632 | position referencing system |
| 634 | DP controller |
| 636 | engine |
| 637 | rudder steerage |
| 638 | vessel bridge controller |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A method of lifting a package in a marine environment, comprising the steps of:
   a) providing first and second vessels;
   b) spanning a first frame between the vessels;
   c) spanning a second frame between the vessels;
   d) spacing the frames apart and connecting the frames to the vessels in a configuration that spaces the vessels apart;
   e) connecting the first frame to the first vessel with a universal joint and to the second vessel with a hinged connection that is not a universal joint, said hinged connection only enabling rotation of said first frame relative to said second vessel about a single axis;
   f) connecting the second frame to the second vessel with a universal joint, and to the first vessel with a hinged connection that is not a universal joint, said hinged connection only enabling rotation of said second frame relative to said first vessel about a single axis;
   g) extending each frame upwardly to an elevation above the vessels;
   h) providing a space under each frame and in between the vessels, enabling a marine vessel to be positioned in between the vessels and under the frames; and
   i) rigging each frame with a winch and a winch line for enabling the combination of vessels and frames to lift objects from a position generally under the frames and in between the vessels.

2. The method of claim 1 wherein one or both vessels is dynamically positioned.

3. The method of claim 1 wherein the dynamic positioning functions of each vessel are controlled from a single pilot house.

4. The method of claim 1 further comprising the step of controlling the position of each vessel with an electronic positioning device.

5. The method of claim 1 further comprising the step of controlling the position of each vessel with a computer.

6. The method of claim 5 wherein a single computer controls the functions of both vessels.

7. The method of claim 2 wherein the dynamic positioning functions of each vessel are controlled by a single pilot.

8. The method of claim 1 wherein the dynamic positioning functions of at least one vessel include thruster functions, steering functions and propulsion functions.

9. The method of claim 1 wherein the dynamic positioning functions of both vessels include thruster functions, steering functions and propulsion functions.

10. The method of claim 1 wherein each boat is a work boat having a bow portion with a pilot house, a deck portion behind the pilot house, a load spreader platform attached to the deck portion and wherein the first and second frames are mounted on the load spreader platform.

11. The method of claim 1 wherein each boat is a work boat having a bow portion with a pilot house, a deck portion behind the pilot house, one or more load spreader platforms attached to the deck portion and wherein the first and second frames are mounted on the one or more load spreader platforms.

12. A catamaran vessel lifting apparatus comprising:
   a) first and second vessels, at least each of the vessels is a dynamically positioned vessel;
   b) a first frame that spans between the vessels;
   c) a second frame that spans between the vessels;
   d) the frames being spaced apart and being connected to the vessels in a configuration that spaces the vessels apart;
   e) the first frame connecting to the first vessel with an articulating joint and to the second vessel with a hinged connection that is not a universal joint, said hinged connection only enabling rotation of said first frame relative to said second vessel about a single axis;
   f) the second frame connecting to the second vessel with an articulating joint, and to the first vessel with a hinged connection that is not a universal joint, said hinged connection only enabling rotation of said second frame relative to said first vessel about a single axis;
   g) each frame extending upwardly to an elevation that is above the vessels, and providing a space under the frame and in between the vessels, enabling a marine vessel to be positioned in between the vessels and under the frames;

h) winches and winch lines rigged to one or more of said frames;

i) a controller for enabling control of the dynamic positioning functions of both vessels from a control house on one of the vessels.

13. The catamaran vessel lifting apparatus of claim 12 wherein the vessel has a bow portion and a stern portion and the control house is located on a stern portion of one of the vessels.

14. The catamaran vessel lifting apparatus of claim 12 wherein the vessel has a bow portion and a stern portion and the articulating connection is located in between the control house and the hinged connection.

15. The catamaran vessel lifting apparatus of claim 12 wherein the controller is a computer.

16. The catamaran vessel lifting apparatus of claim 12 wherein each of the vessels has thruster and steering functions and each of these functions is controlled from one of the vessels.

17. The catamaran vessel lifting apparatus of claim 12 wherein each of the vessels has a propulsion function and the propulsion function of each vessel is controlled from one of the vessels.

18. The catamaran vessel lifting apparatus of claim 16 wherein each of the functions is controlled from the control house.

19. The catamaran vessel lifting apparatus of claim 17 the propulsion function is controlled from the control house.

20. The catamaran vessel lifting apparatus of claim 12 wherein said vessel is a type DP-2 vessel.

21. A method creating an overall structurally integrated vessel from two existing vessels comprising the steps of:

1) providing a first used vessel, the first vessel comprising:
   (a) a hull,
   (b) a thruster for the first vessel powering the hull of the first vessel,
   (c) a position reference system for the first vessel providing the position of the first vessel, and
   (d) a DP controller system for the first vessel operatively connected to the first thruster of the first vessel and first position referencing system of the first vessel;

2) providing a second used vessel comprising:
   (a) a hull,
   (b) a thruster for the second vessel powering the hull of the second vessel,
   (c) a position referencing system for the second vessel providing the position of the second vessel,
   (d) a DP controller system for the second vessel operatively connected to the thruster for the second vessel and position referencing system for the second vessel;

3) retrofitting the first and second vessels by
   (i) spanning a first frame between the vessels;
   (ii) spanning a second frame between the vessels;
   (iii) spacing the frames apart and connecting the frames to the vessels in a configuration that spaces the vessels apart;
   (iv) connecting the first frame to the first vessel with a universal joint and to the second vessel with a hinged connection;
   (v) connecting the second frame to the second vessel with a universal joint, and to the first vessel with a hinged connection;
   (vi) extending each frame upwardly;
   (vii) providing a space under the frame and in between the vessels, enabling a marine vessel to be positioned in between the vessels and under the frames; and
   (viii) rigging each frame with a winch and a winch line for enabling the combination of vessels and frames to lift objects from a position generally under the frames and in between the vessels;

4) providing an overall DP controller system operatively connected to both the DP controller system for the first vessel and the DP controller system for the second vessel, wherein the overall DP controller system directly or indirectly controls one or more of the following:
   (i) thruster for the first vessel,
   (ii) position referencing system for the first vessel,
   (iii) thruster for the second vessel, and
   (iv) position referencing system for the second vessel.

22. A method creating an overall structurally integrated vessel from two existing vessels comprising the steps of:

1) providing a first used vessel, the first vessel comprising:
   (a) a hull,
   (b) a plurality of thrusters for the first vessel, each powering the hull of the first vessel,
   (c) a plurality of position referencing systems for the first vessel, each providing the position of the first vessel, and
   (d) a plurality of DP controller systems for the first vessel, each being operatively connected to the plurality of thrusters for the first vessel and plurality of position referencing systems for the first vessel;

2) providing a second used vessel comprising:
   (a) a hull,
   (b) a plurality of thrusters for the second vessel, each powering the hull of the second vessel,
   (c) a plurality of position referencing systems for the second vessel, each providing the position of the second vessel,
   (d) a plurality of DP controller systems for the second vessel, each being operatively connected to the plurality of thrusters for the second vessel and plurality of position referencing system for the second vessel; and 3) retrofitting the first and second vessels by
   (i) spanning a first frame between the vessels;
   (ii) spanning a second frame between the vessels;
   (iii) spacing the frames apart and connecting the frames to the vessels in a configuration that spaces the vessels apart;
   (iv) connecting the first frame to the first vessel with a universal joint and to the second vessel with a hinged connection;
   (v) connecting the second frame to the second vessel with a universal joint, and to the first vessel with a hinged connection;
   (vi) extending each frame upwardly and providing a space under the frame and in between the vessels, enabling a marine vessel to position in between the vessels and under the frames; and
   (vii) rigging each frame with a winch and a winch line for enabling the combination of vessels and frames to lift objects from a position generally under the frames and in between the vessels; and 4) providing an overall DP controller system operatively connected to both the DP controller system for the first vessel and the DP controller system for the second vessel, wherein the DP controller can directly or indirectly control any of the following:

(i) one or more of the thrusters for the first vessel,
(ii) one or more of the position referencing systems for the first vessel,
(iii) one or more of the thrusters for the second vessel, and
(iv) one or more of the position referencing systems for the second vessel.

23. A method creating an overall structurally integrated vessel from two existing vessel comprising the steps of:
1) providing a first used vessel, the first vessel comprising:
   (a) a hull,
   (b) an engine for the first vessel powering the hull of the first vessel, and
   (c) a steerage system for the first vessel steering the first vessel;
2) providing a second used vessel comprising:
   (a) a hull,
   (b) an engine for the second vessel powering the hull of the second vessel, and
   (c) a steerage system for the second vessel steering the second vessel;
3) retrofitting the first and second vessels by (i) spanning a first frame between the vessels;
   (ii) spanning a second frame between the vessels;
   (iii) spacing the frames apart and connecting the frames to the vessels in a configuration that spaces the vessels apart;
   (iv) connecting the first frame to the first vessel with a universal joint and to the second vessel with a hinged connection;
   (v) connecting the second frame to the second vessel with a universal joint, and to the first vessel with a hinged connection;
   (vi) extending each frame upwardly and providing a space under the frame and in between the vessels, enabling amarine vessel to position in between the vessels and under the frames; and
   (vii) rigging each frame with a winch and a winch line for enabling the combination of vessels and frames to lift objects from a position generally under the frames and in between the vessels; and
4) providing an overall bridge controller computer operatively connected to each of the engine for the first vessel, steerage system for the first vessel, engine for the second vessel, and steerage system for the second vessel, wherein the overall bridge controller computer can directly or indirectly control one or more of the following:
(i) engine for the first vessel,
(ii) steerage system for the first vessel,
(iii) engine for the second vessel, and
(iv) steerage system for the second vessel.

24. A method creating an overall structurally integrated vessel from two existing vessel comprising the steps of:
1) providing a first used vessel, the first vessel comprising:
   (a) a hull,
   (b) a plurality of engines for the first vessel, each powering the hull of the first vessel, and
   (c) a plurality of steerage systems for the first vessel, each steering the first vessel;
2) providing a second used vessel comprising:
   (a) a hull,
   (b) a plurality of engines for the second vessel, each powering the hull of the second vessel, and
   (c) a plurality of steerage systems for the second vessel, each steering the second vessel,
3) retrofitting the first and second vessels by
   (i) spanning a first frame between the vessels;
   (ii) spanning a second frame between the vessels;
   (iii) spacing the frames apart and connecting the frames to the vessels in a configuration that spaces the vessels apart;
   (iv) connecting the first frame to the first vessel with a universal joint and to the second vessel with a hinged connection;
   (v) connecting the second frame to the second vessel with a universal joint, and to the first vessel with a hinged connection;
   (vi) extending each frame upwardly and providing a space under the frame and in between the vessels, enabling amarine vessel to position in between the vessels and under the frames; and
   (vii) rigging each frame with a winch and a winch line for enabling the combination of vessels and frames to lift objects from a position generally under the frames and in between the vessels; and
4) providing an overall bridge controller computer operatively connected to each of the engines for the first vessel, steerage systems for the first vessel, engines for the second vessel, and steerage systems for the second vessel, wherein the overall bridge controller computer can directly or indirectly control the following:
(i) one or more of the engines for the first vessel,
(ii) one of more of the steerage systems for the first vessel,
(iii) one or more of the engines for the second vessel, and
(iv) one or more of the steerage systems for the second vessel.

* * * * *